(12) United States Patent
Masters et al.

(10) Patent No.: US 11,067,827 B2
(45) Date of Patent: Jul. 20, 2021

(54) SYSTEM TO SECURE GLASSES TO HAT

(71) Applicant: Joseph Michael Masters, Lenoir City, TN (US)

(72) Inventors: Joseph Michael Masters, Lenoir City, TN (US); Ryan Matthew Peterson, Oak Ridge, TN (US); Lenny Robert Jordan, Sarasota, FL (US)

(73) Assignee: Joseph Micael Masters, Lenoir City, TN (US)

( * ) Notice: Subject to any disclaimer, the term of this patent is extended or adjusted under 35 U.S.C. 154(b) by 182 days.

(21) Appl. No.: 16/592,398

(22) Filed: Oct. 3, 2019

(65) Prior Publication Data
US 2020/0159039 A1 May 21, 2020

Related U.S. Application Data

(60) Provisional application No. 62/740,734, filed on Oct. 3, 2018.

(51) Int. Cl.
G02C 3/02 (2006.01)
G02C 3/00 (2006.01)
G02C 5/14 (2006.01)
A42B 1/247 (2021.01)
A45F 5/02 (2006.01)

(52) U.S. Cl.
CPC ............... *G02C 3/02* (2013.01); *A42B 1/247* (2013.01); *G02C 3/006* (2013.01); *G02C 5/143* (2013.01); *A45F 5/02* (2013.01); *G02C 2200/02* (2013.01)

(58) Field of Classification Search
CPC ........ G02C 3/02; G02C 2200/02; G02C 3/04; G02C 5/143; G02C 3/006; A45F 5/02; A42B 1/247
See application file for complete search history.

(56) References Cited

U.S. PATENT DOCUMENTS

| 4,136,934 | A | 1/1979 | Seron |
| 4,179,753 | A | 12/1979 | Aronberg et al. |
| 4,471,509 | A | 9/1984 | Marks |
| 5,491,842 | A | 2/1996 | Braswell-Moore |
| 5,533,207 | A | 7/1996 | Diaz |
| 5,933,871 | A | 8/1999 | Kraft |
| 6,298,495 | B1 | 10/2001 | Totani |
| 6,397,396 | B1 | 6/2002 | Vibert |
| 6,481,059 | B2 | 11/2002 | Morris |
| 6,647,554 | B1 | 11/2003 | Yan |
| 7,325,920 | B1 | 2/2008 | Gelfuso |

(Continued)

OTHER PUBLICATIONS

Patent Cooperation Treaty, Int'l Search Report & Written Opinion, Form PCT/ISA/220 (Revised Jan. 2019).

*Primary Examiner* — George G King
(74) *Attorney, Agent, or Firm* — Pitts & Lake, P.C.

(57) ABSTRACT

A system is provided to secure a pair of glasses to a hat, the system including a hatband insert configured to be inserted in a hatband of a hat, one or more hatband magnetic members configured to be selectively attachable to a plurality of locations of the hatband insert, and one or more glasses magnetic members configured to be attached to each temple of a pair of glasses, wherein the one or more hatband magnetic members and the one or more glasses magnetic members are configured to be magnetically attached to selectively secure the glasses to the hat.

13 Claims, 19 Drawing Sheets

(56) References Cited

U.S. PATENT DOCUMENTS

| | | | |
|---|---|---|---|
| 7,703,153 B2 | 4/2010 | de Taboada | |
| 7,866,813 B2 | 1/2011 | Anhalt | |
| 7,904,970 B2 | 3/2011 | Thomas | |
| 8,381,359 B1 | 2/2013 | McArdle | |
| 8,696,112 B1 | 4/2014 | Vaught | |
| 8,740,379 B2 | 6/2014 | Berger | |
| 9,354,454 B1* | 5/2016 | Tharp | G02C 3/006 |
| 2005/0108855 A1 | 5/2005 | Wolf | |
| 2006/0152671 A1 | 7/2006 | Risso et al. | |
| 2007/0006612 A1 | 1/2007 | Ignatowski | |
| 2007/0256214 A1 | 11/2007 | Mcgowan et al. | |
| 2009/0056000 A1 | 3/2009 | de Taboada | |
| 2009/0235437 A1 | 9/2009 | Springer et al. | |
| 2009/0284712 A1 | 11/2009 | Brooks | |
| 2010/0014046 A1 | 1/2010 | Millios | |
| 2010/0212066 A1 | 8/2010 | Gilman | |
| 2011/0225707 A1 | 9/2011 | Millios | |
| 2013/0227768 A1* | 9/2013 | Van Waes | A42B 3/185 |
| | | | 2/422 |
| 2013/0340142 A1* | 12/2013 | Saladino | A42B 1/241 |
| | | | 2/181 |
| 2014/0063443 A1 | 3/2014 | Berger | |
| 2015/0013114 A1 | 1/2015 | Grame et al. | |
| 2015/0253584 A1 | 9/2015 | Pond | |
| 2016/0025998 A1* | 1/2016 | Ruhland | G02C 3/006 |
| | | | 351/157 |
| 2018/0074342 A1 | 3/2018 | Boedecker et al. | |
| 2019/0101772 A1* | 4/2019 | Lowe | A42B 1/247 |
| 2019/0246731 A1 | 8/2019 | Luo | |

* cited by examiner

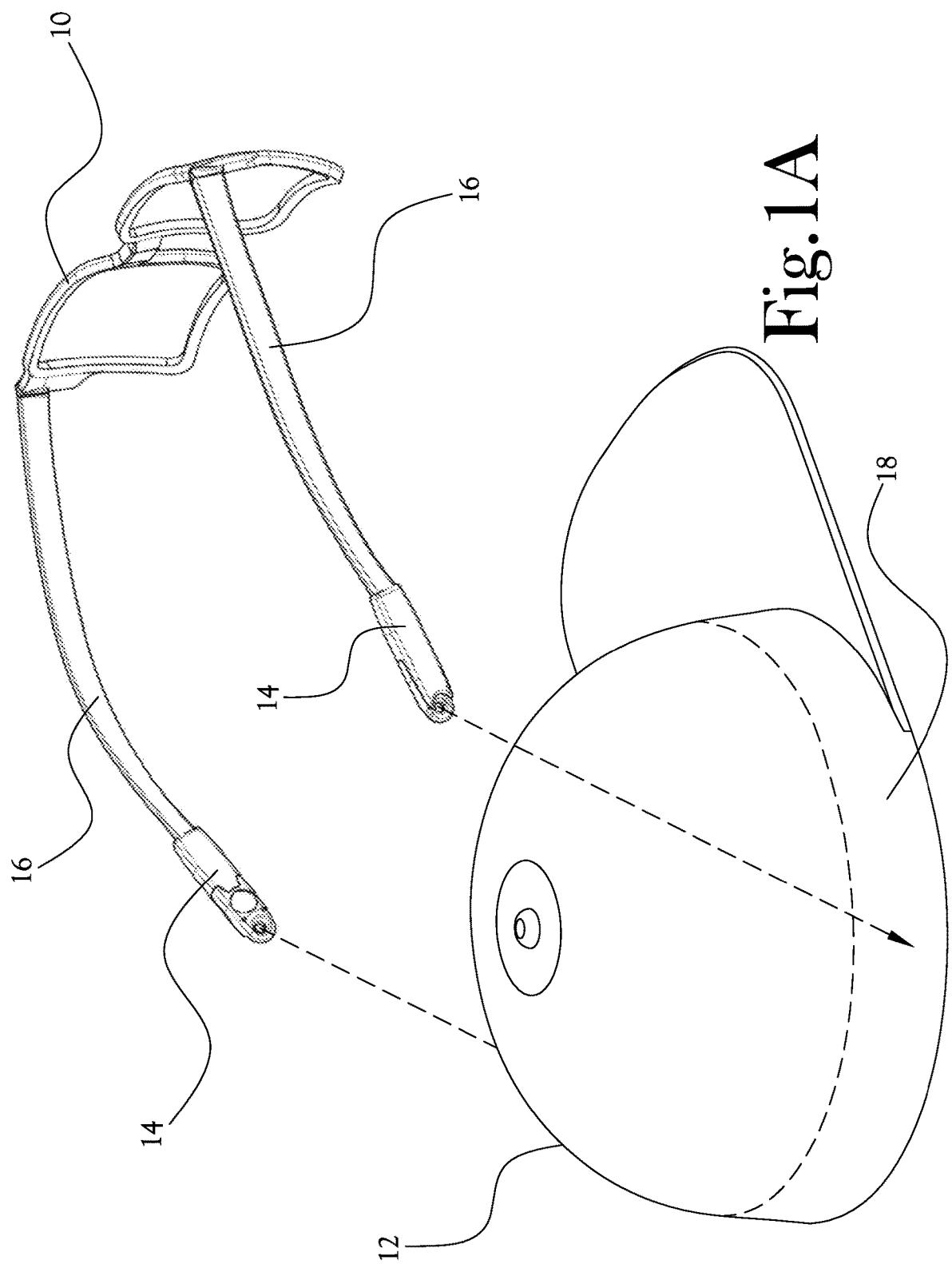

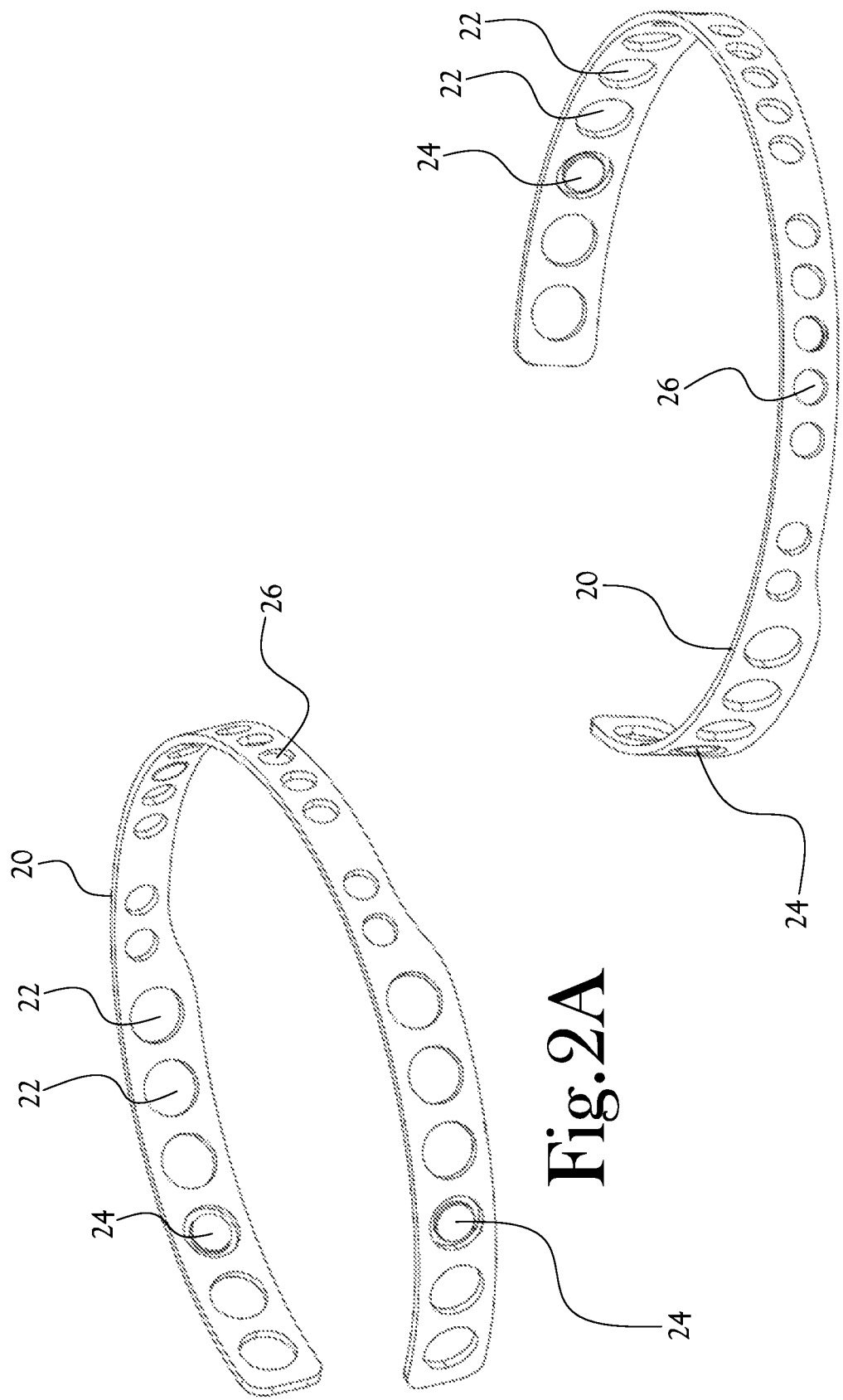

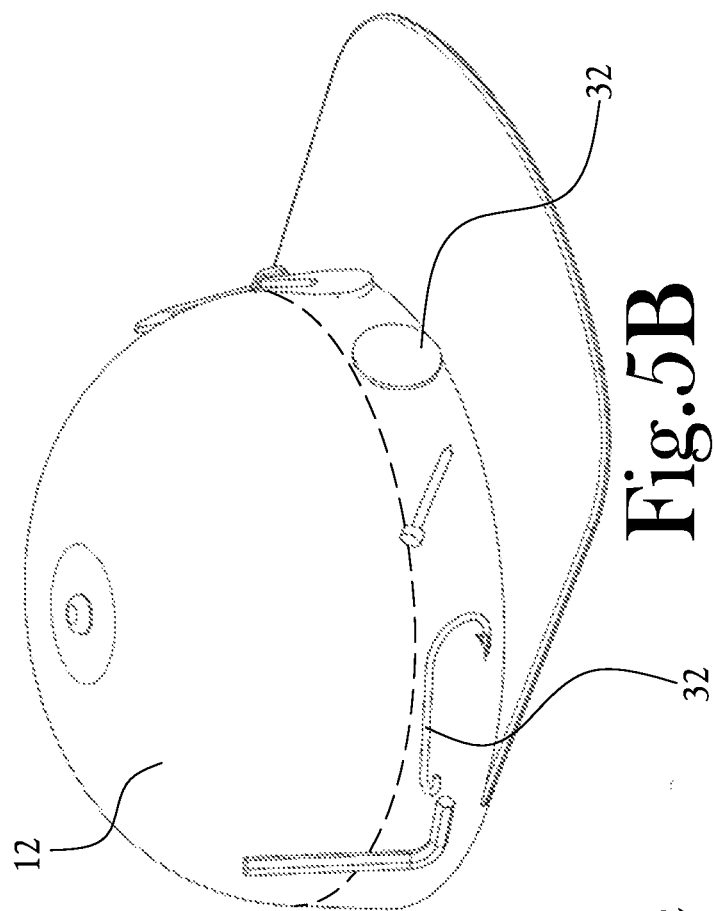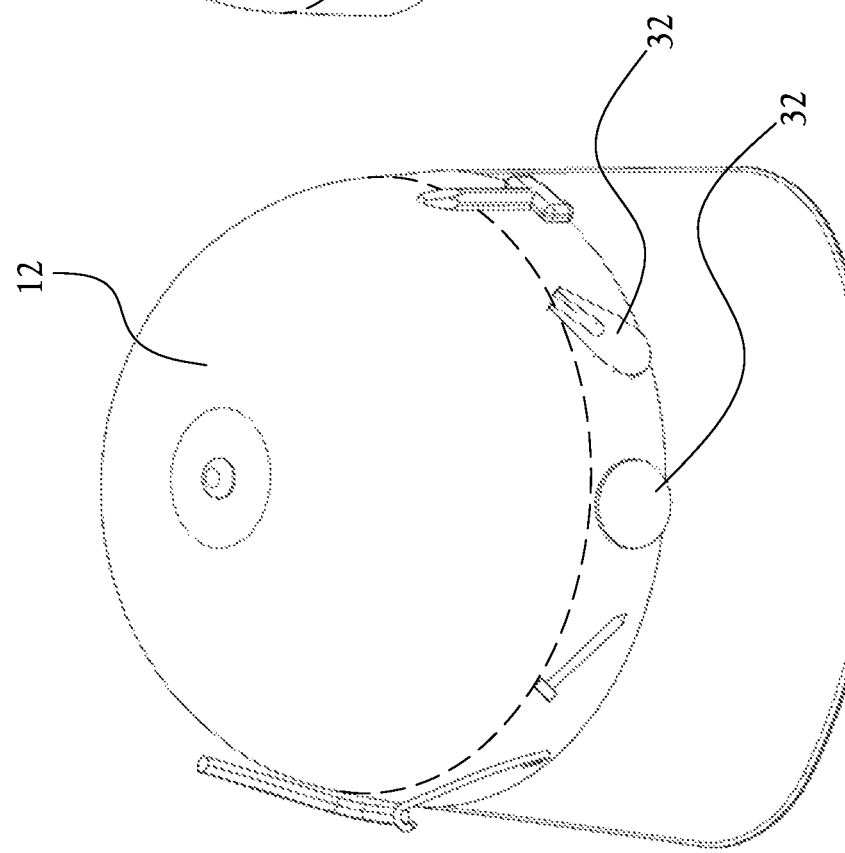

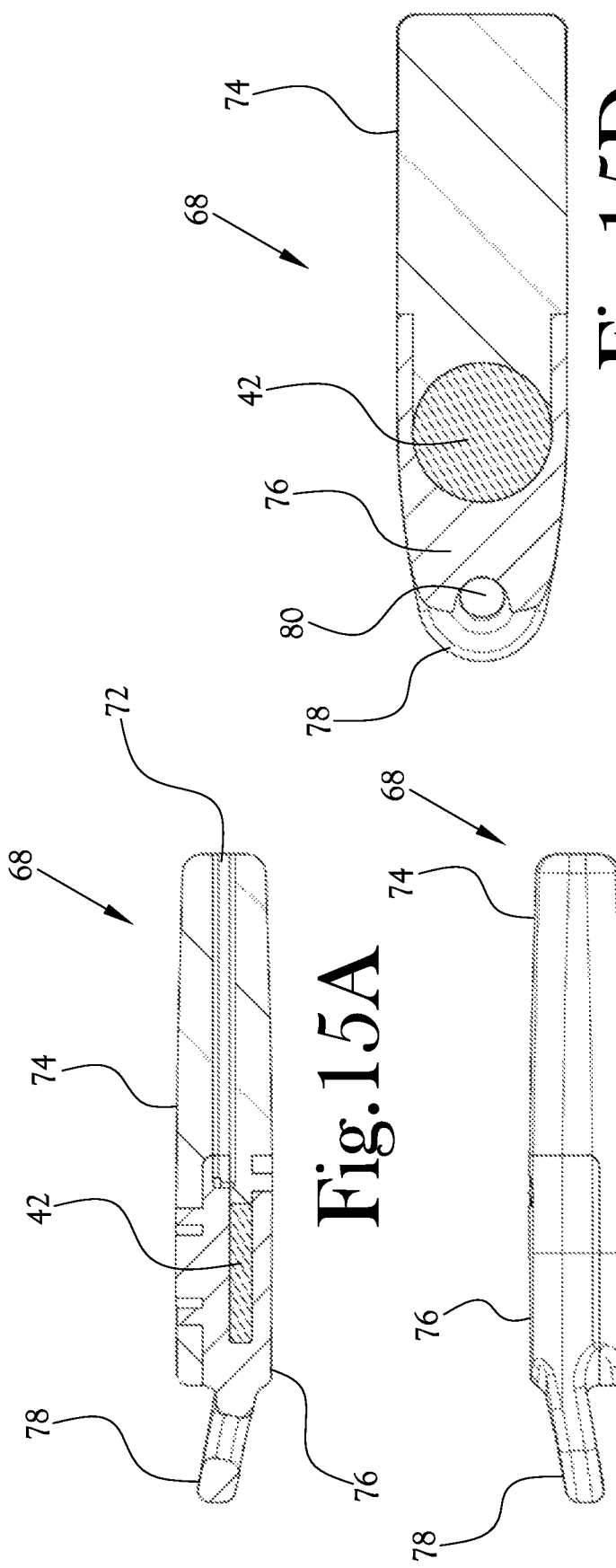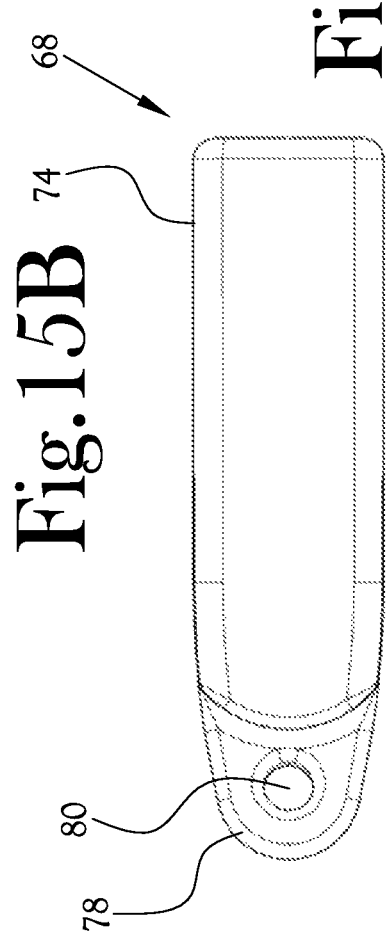

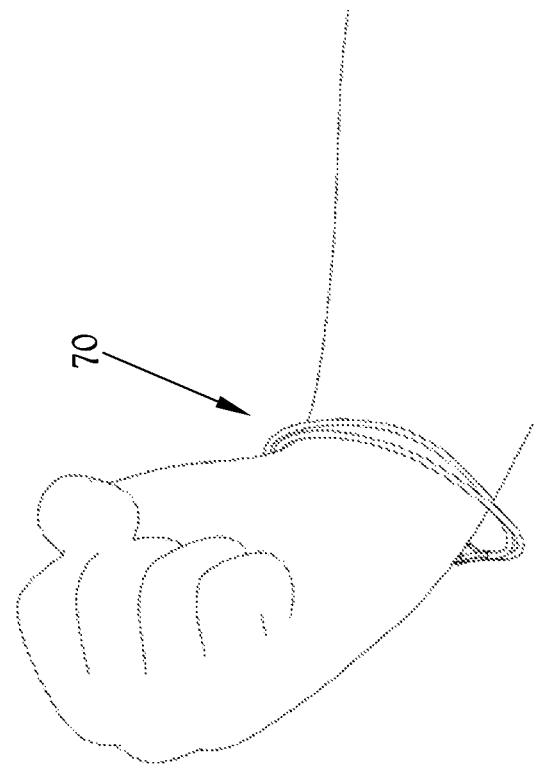
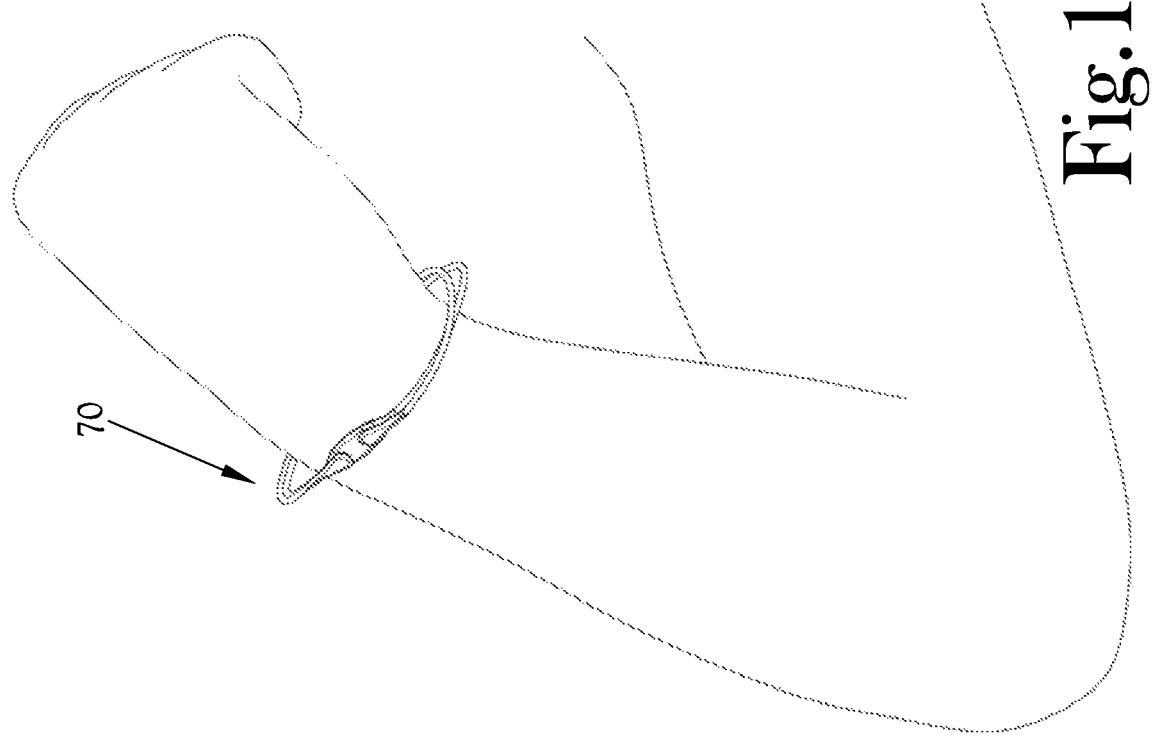
Fig.19A
Fig.19B

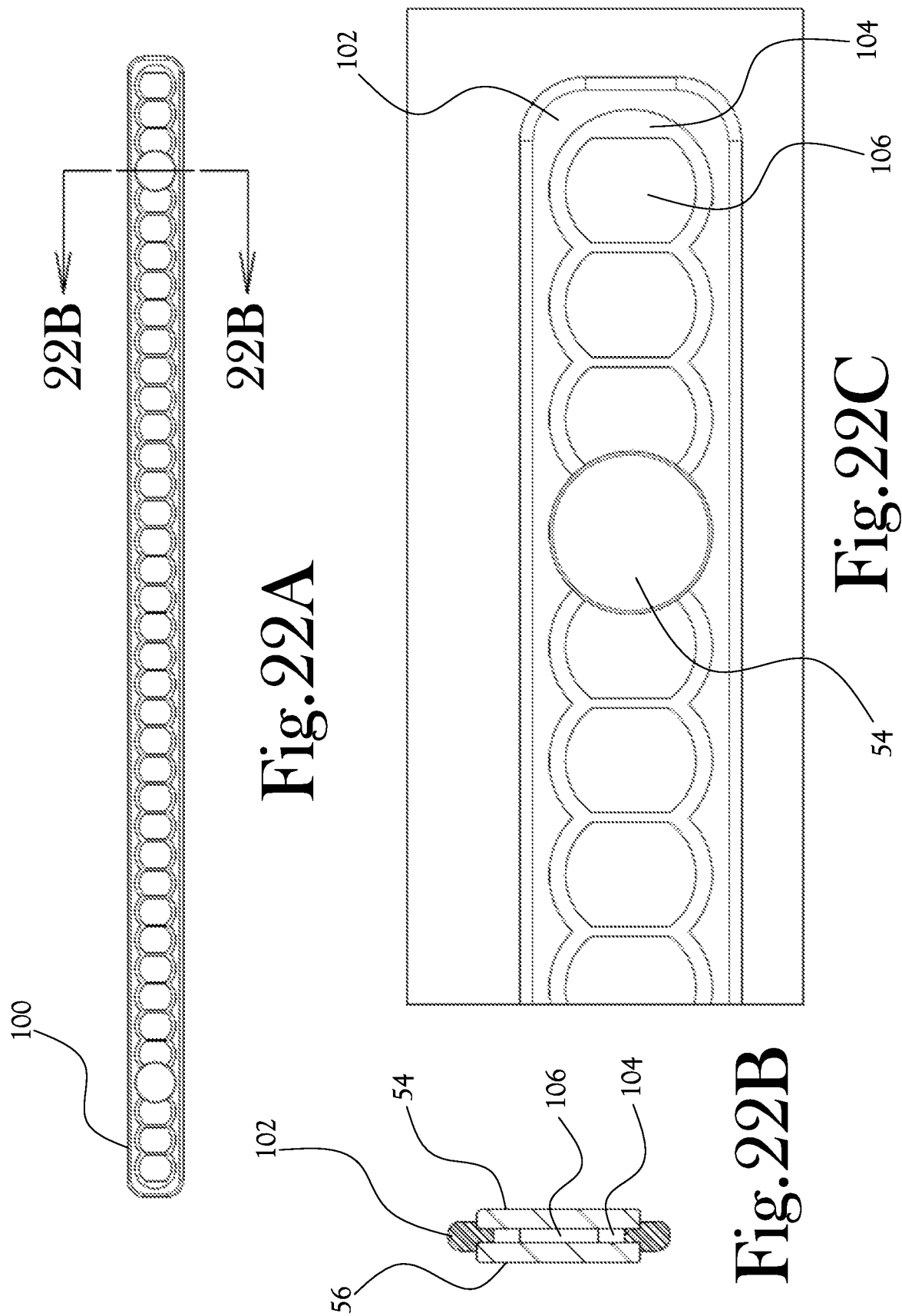

SYSTEM TO SECURE GLASSES TO HAT

CROSS-REFERENCE TO RELATED APPLICATIONS

This application claims the benefit of U.S. Provisional Patent Application Ser. No. 62/740,734, filed on Oct. 3, 2018, which is incorporated herein in its entirety by reference.

FIELD OF INVENTION

The present general inventive concept relates to a securing system for glasses, and, more particularly, to a securing system to magnetically secure glasses to a hat or other wearable article at least when the glasses are not being worn.

BACKGROUND

Many people use glasses, especially sunglasses, only intermittently during the day and/or night. It can be difficult, especially when outdoors, at entertainment events, etc., to keep glasses secure and safe when the glasses are not being worn for vision purposes. For instance, a user may want to take sunglasses off when temporarily going indoors to complete a task, but may be worried about losing the sunglasses, or breaking them by trying to store them in a pocket. Therefore, a convenient way to secure glasses to clothing or a hat so that they can be easily and quickly accessed would be beneficial, so that the user does not have to worry about losing his or her glasses, or damaging them by setting them down in an unsecured area.

BRIEF SUMMARY

According to various example embodiments of the present general inventive concept, provided is a system to secure glasses to a hat or other article of clothing by magnetically attaching the glasses to the hat or article of clothing. Various example embodiments of the present general inventive concept may also provide a retaining strap employing features for increased convenience, and that may be used along with the magnetic attachment system.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a system to secure a pair of glasses to a hat, the system including a hatband insert configured to be inserted in a hatband of a hat, one or more hatband magnetic members configured to be selectively attachable to a plurality of locations of the hatband insert, and one or more glasses magnetic members configured to be attached to each temple of a pair of glasses, wherein the one or more hatband magnetic members and the one or more glasses magnetic members are configured to be magnetically attached to selectively secure the glasses to the hat.

The foregoing and/or other aspects and advantages of the present general inventive concept may also be achieved by providing a retaining system for retaining a pair of glasses, the system including a retaining strap having coupling portions provided at each end, the coupling portions being configured to be coupled to respective eyeglass temples, and a pair of auxiliary coupling portions proximate a middle area of the retaining strap, the auxiliary coupling portions being configured to be respectively coupled to the coupling portions of the retaining strap when the coupling portions are not coupled to the eyeglass temples.

The foregoing and/or other aspects and advantages of the present general inventive concept may also be achieved by providing magnetically attached to the hatband magnetic members to selectively secure the glasses to the hat, and a retaining strap configured with a protruding member at each end, wherein the temple attachments include extending portions configured to extend back from the temples and having receiving portions configured to selectively receive the protruding members of the retaining straps, and wherein the retaining strap is formed with a pair of auxiliary receiving portions proximate a middle area of the retaining strap, the auxiliary receiving portions configured to respectively receive the protruding members of the retaining strap when the protruding members are not received by the temple attachments.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 1A-B illustrate a system to secure a pair of glasses to a hat according to an example embodiment of the present general inventive concept;

FIGS. 2A-B illustrate a hatband insert used in the system illustrated in FIGS. 1A-B;

FIGS. 5A-B illustrate an additional use of a system using the hatband insert of FIG. 3;

FIGS. 15A-D illustrate an example embodiment of the magnetic temple attachment of FIG. 14;

FIGS. 19A-B illustrate a user wearing the stored retaining strap of FIGS. 18A-D;

FIGS. 22A-C illustrate a hatband insert according to still another example embodiment of the present general inventive concept.

DETAILED DESCRIPTION

Figure 1B:
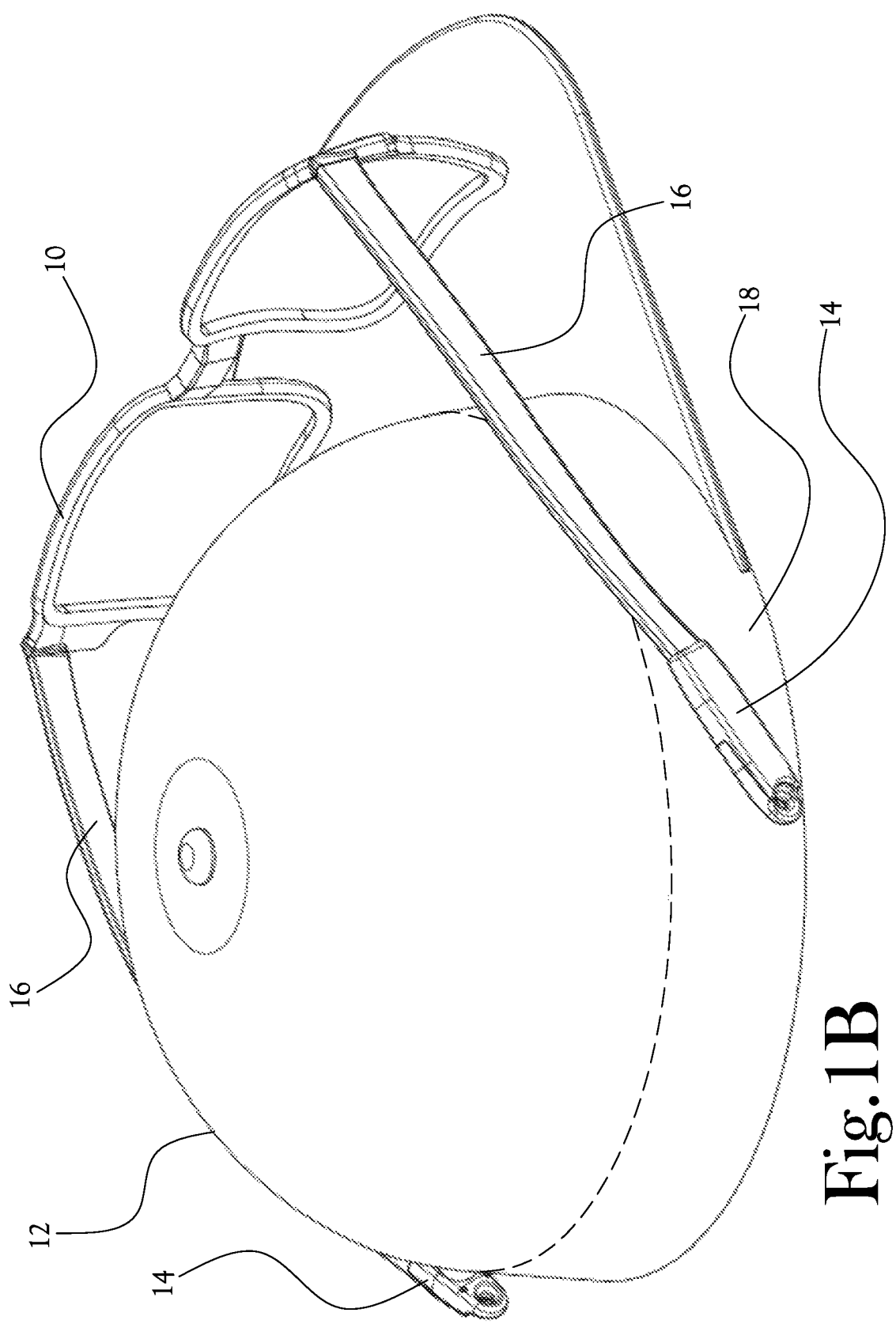

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a system is provided to secure glasses, such as sunglasses to a user's hat when the user is not wanting to use the glasses. Various features of some of the example embodiments described herein also include available attachments to other articles of clothing, and/or including a retaining strap. Most hats, such as baseball caps, are provided with a hatband located either inside or outside the hat, and a hatband insert may be easily placed inside to provide a magnetic connection to connect the glasses to the hat via a magnetic element equipped sleeve slid over the earpiece of the glasses. As the inner hatband is sometimes referred to as a sweatband, liner, collar, etc., it is noted herein that the term hatband may refer to both outer and inner headbands in caps and other hats. Also, while the descriptions herein typically discuss a hatband insert being "inside" the hatband, it is understood that such a configuration typically refers to the hatband insert being between the hatband and the hat, although in various embodiments a hatband insert may be located between actual layers of the hatband itself. In various example embodiments of the present general inventive concept, the temple or earpiece of the glasses may be formed of a magnetic material itself, or otherwise be equipped with an embedded or attached magnetic element, so that the sleeve or other magnetic attachment is not required to magnetically couple the glassed to the hat via the hatband insert. It is noted that these descriptions may use terms such as magnets, magnetic elements, magnetic members, magnetic portions, etc., interchangeably to refer to a body that has magnetic attraction to another magnetic body.

FIGS. 1A-B illustrate a basic view of a system to secure a pair of glasses to a hat according to an example embodiment of the present general inventive concept. In FIG. 1A, a pair of glasses 10 is equipped to be secured to a hat 12 due to a pair of magnetic temple attachments 14 provided at distal ends of the temples 16 of the glasses 10. These magnetic temple attachments 14 are configured to be magnetically attracted to one or more magnetic elements located inside a hatband 18 of the hat 12. While the magnetic elements are not shown in FIGS. 1A-B between the hatband 18 and the hat 12 itself, these magnetic elements are discussed in detail regarding various example embodiments illustrated herein. Also, while the magnetic temple attachments 14 illustrated in FIGS. 1A-B are shown with a level of detail similar to a later discussed embodiment, it is understood that identifier 14 is generally indicating a simple temple attachment with a magnetic element located on or therein. FIG. 1B illustrates the glasses 10 secured to the hat 12 through the magnetic attraction between the magnetic temple attachments 14 and the magnetic elements below the hatband 18. In various example embodiments the magnetic temple attachments may be slipped over distal ends of the temples, wrapped around proximate ends of the temples, formed integrally with the temples, permanently fixed to the temples, and so on without departing from the scope of the present general inventive concept.

FIGS. 2A-B illustrate an example embodiment of a hatband insert used in the system illustrated in FIGS. 1A-B. As illustrated in FIGS. 2A-2B, the hatband insert 20 is configured with a shape that generally conforms with a hatband, and may be flexible enough to accommodate different sizes of hats. The hatband insert 20 is generally flat and elongated, so as to slip easily inside the inner hatband 18 of the hat 12. A plurality of openings 22 are provided along the length of the hatband insert 20, the openings 22 being configured to receive and secure one or more hatband magnetic members 24 that may be selectively placed along the hatband insert 20 so as to match different desired locations that will correspond with the magnetic temple attachments 14 attached to the glasses 10. In FIGS. 2A-B, hatband magnetic members 24 are provided in the third opening from each end of the hatband insert 20, but could be located at various other locations. Various example embodiments of the present general inventive concept may include different sizes of openings such that the openings 22 along the side of the hatband insert 20 may be used to receive hatband magnetic members 24 that correspond to the magnetic temple attachments 14, while one or more smaller openings 26 may be provided to receive smaller magnetic elements to which various metal accessories may be attracted. In the example embodiment illustrated in FIGS. 2A-B, the smaller openings 26 are located at the front of the hatband insert 20 at a portion which narrows to accommodate the stitching of the bill of the hat 12, but other example embodiments may have different configurations. Also, while the openings 22,26 in this example embodiment are illustrated as being provided along most of the length of the hatband insert 20, other example embodiments may have more or fewer such openings. A couple of benefits of having such openings 22, rather than simply an entire magnetic hatband insert, are reduced weight and increased ventilation of the glasses securing system, which increases user convenience and enjoyment.

Figure 3:
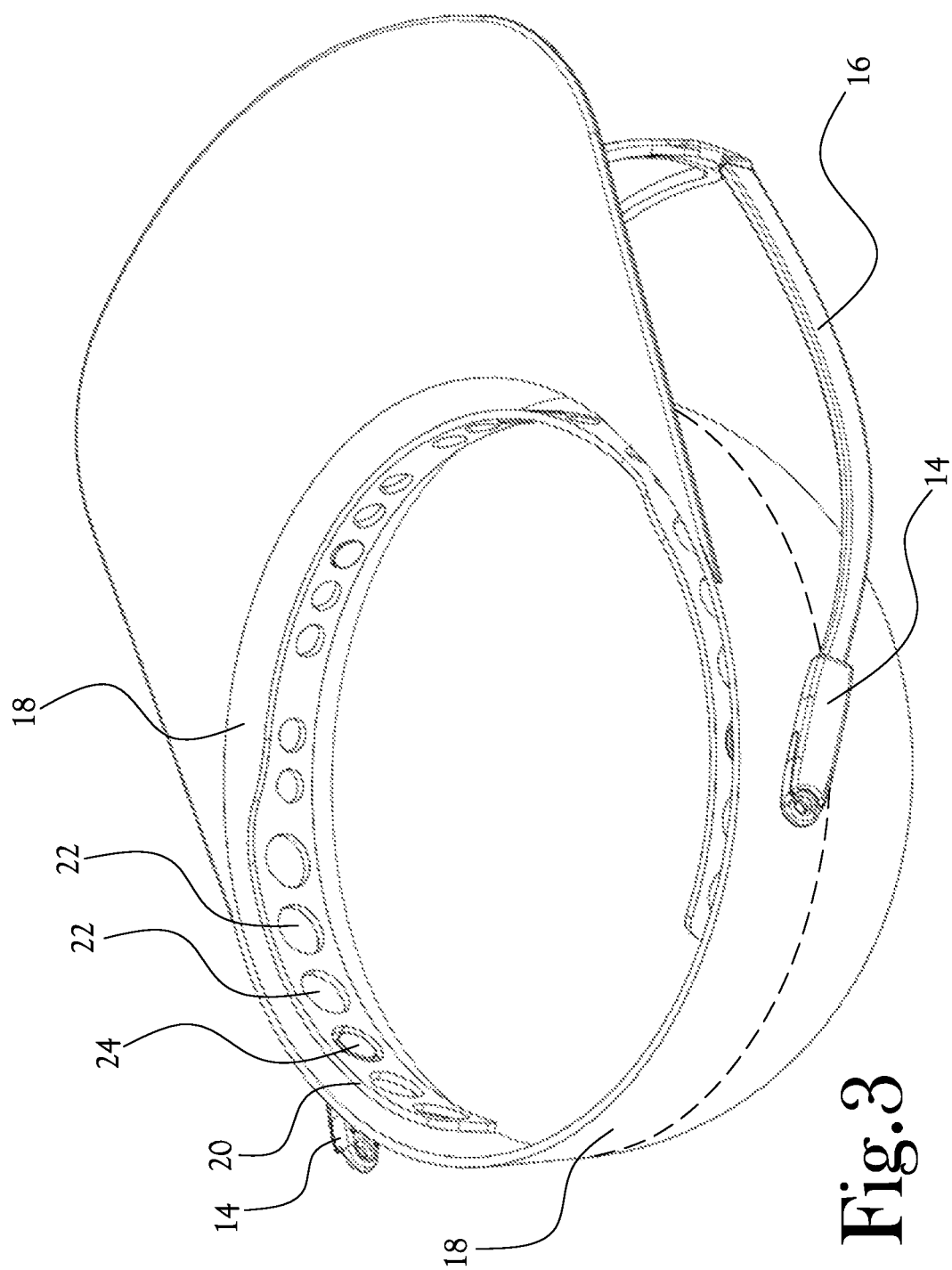
FIG. 3 illustrates the hatband insert of FIGS. 2A-B used in the system illustrated in FIGS. 1A-B.

FIG. 3 illustrates the hatband insert of FIGS. 2A-B used in the system illustrated in FIGS. 1A-B. It is noted that the hatband insert 20 is shown as being adjacent to the hatband 18, rather than its proper placement between the hatband insert 20 and the hat 12, and is illustrated this way simply for clarity to show the positioning of the hatband insert 20 relative to the hat 12 and the magnetic temple attachments 14 attached to the temples 16 of the glasses 10. As illustrated in FIG. 3, the magnetic temple attachments 14 are aligned with the hatband magnetic members 24 to provide the magnetic attachment that secures the glasses 10 to the hat 12.

Figure 4:
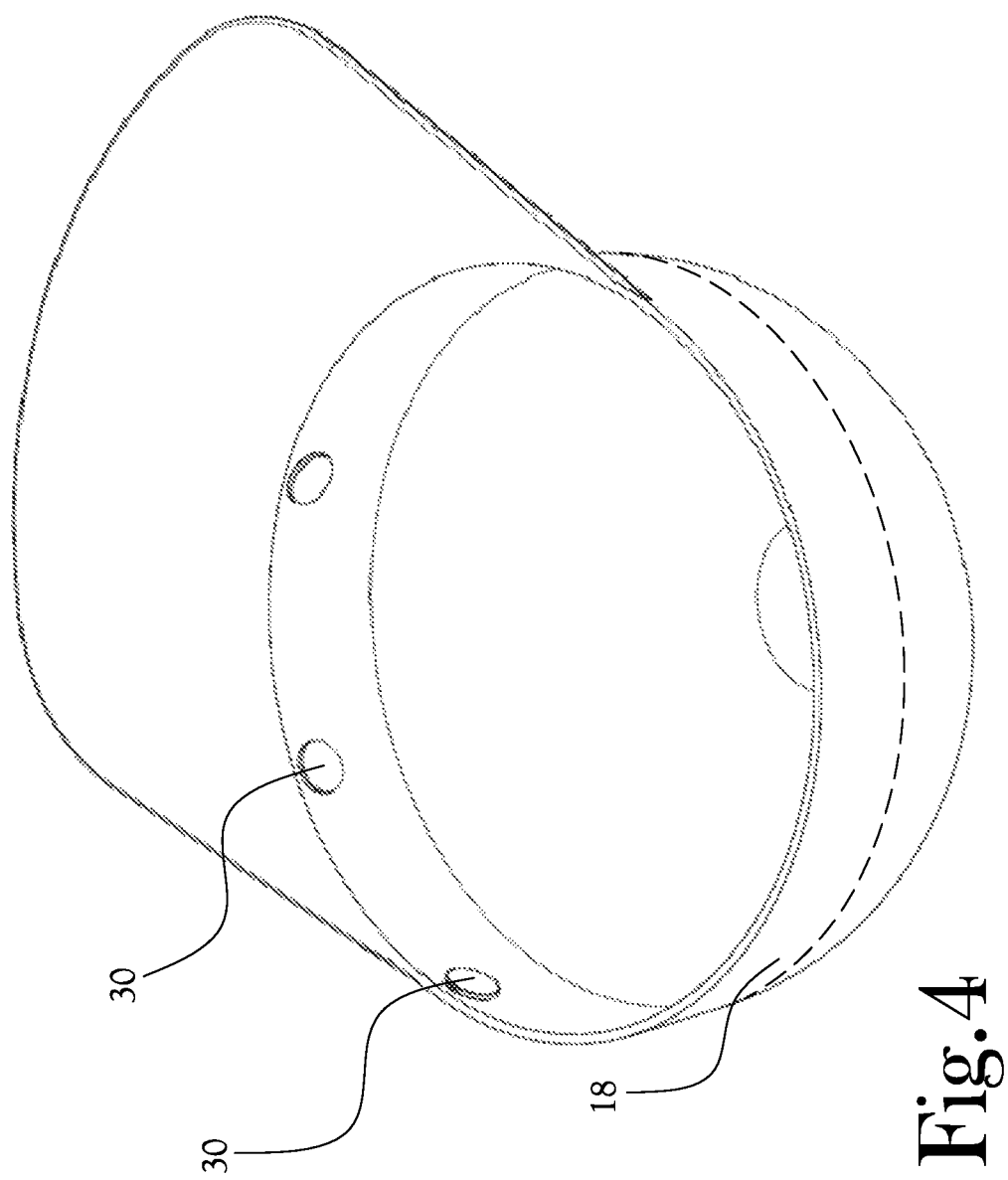
FIG. 4 illustrates a system to secure a pair of glasses to a hat according to another example embodiment of the present general inventive concept.

FIG. 4 illustrates a system to secure a pair of glasses to a hat according to another example embodiment of the present general inventive concept. In the example embodiment illustrated in FIG. 4, a plurality of hatband magnetic members 30 are simply placed inside the hatband 18 without a hatband insert. Again, the magnetic members are shown as being adjacent to the hatband 18, but would be placed between the hatband 18 and the hat 12. The view of FIG. 4 simply shows an example placement of the magnetic members 30, which in some example embodiments may be glued or sewn in place. Such an embodiment may not have the versatility that a hatband insert gives a user when changing the orientation of the magnetic elements. In this example embodiment, the magnetic members 30 would be placed to correspond to the magnetic temple attachments 14 provided on the temples 16 of the glasses 10.

FIGS. 5A-B illustrate an additional use of a system using the hatband insert of FIG. 3. As previously discussed in regard to FIGS. 2A-B, additional magnetic elements may be placed along the hatband insert 20 to allow metallic accessories 32 such as golf ball markers, fish hooks, divot repair tools, allen wrenches, and so on to be easily attached to the hat 12 for quick and easy access by the user. The additional magnetic elements may be of the same or a different size than the hatband magnetic members 24 used to secure the glasses 10.

Figure 6:
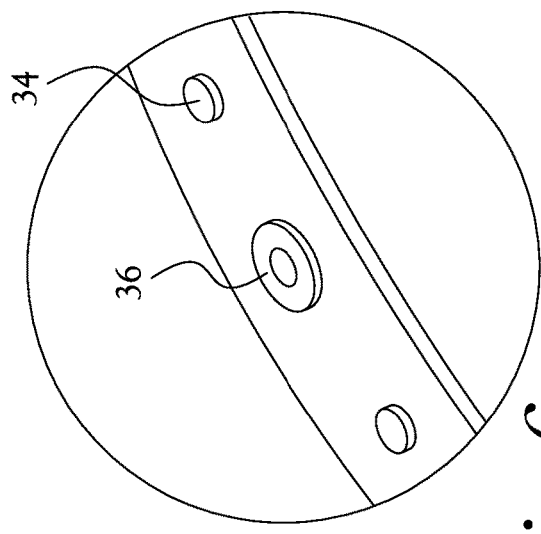
FIG. 6 illustrates a hatband insert according to another example embodiment of the present general inventive concept.

FIG. 6 illustrates a partial view of a hatband insert according to another example embodiment of the present general inventive concept. In the example embodiment of FIG. 6, a hatband insert is provided with protruding members 34, instead of openings 22, along a length of the hatband insert, and hatband magnetic members 36 are provided with recesses or through openings formed to receive the protruding members 34 such that the hatband magnetic members 36 can simply be slid onto the protruding members 34. In various example embodiments the hatband magnetic members may be configured to stay attached to the protruding members 34 through a friction fit, a snap fit, or the like.

Figure 7:
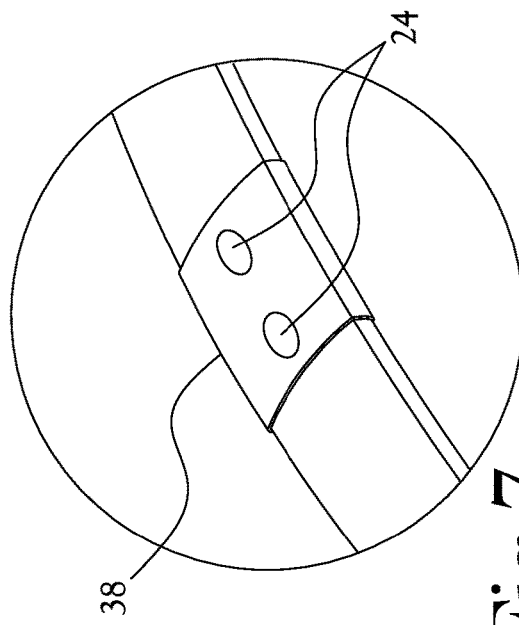
FIG. 7 illustrates a hatband insert according to yet another example embodiment of the present general inventive concept.

FIG. 7 illustrates a hatband insert according to yet another example embodiment of the present general inventive concept. In the example embodiment of FIG. 7, a hatband insert is provided with a sliding hatband magnetic member element 38, including one or more hatband magnetic members 24, that is configured to slide along the hatband insert to the desired location of the user. The sliding hatband magnetic member element 38 may to completely surround a portion of the hatband, or may simply wrap around a top and/or bottom edge of the hatband.

Figure 9:
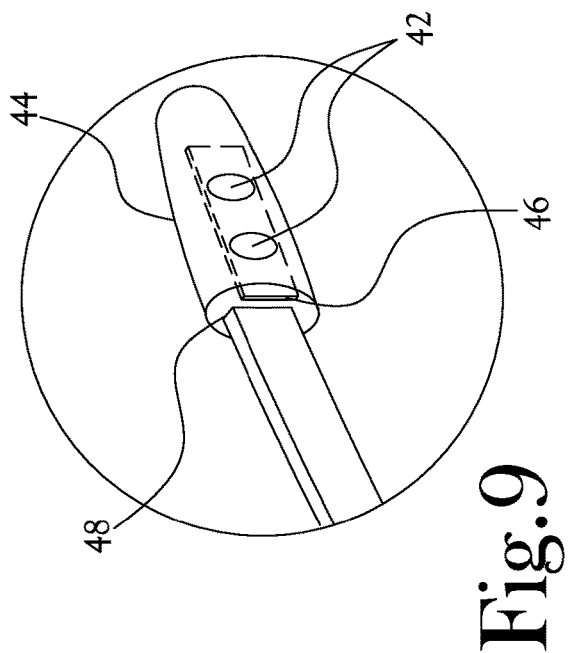
FIG. 9 illustrates a temple attachment according to another example embodiment of the present general inventive concept.
Figure 8:
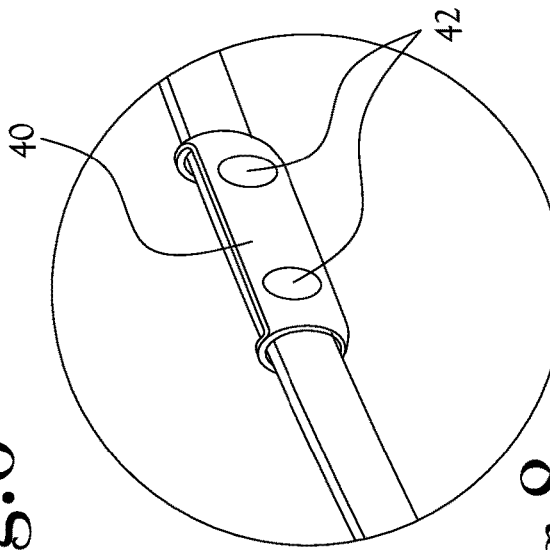
FIG. 8 illustrates a temple attachment according to an example embodiment of the present general inventive concept.

FIG. 8 illustrates a temple attachment according to an example embodiment of the present general inventive concept. In the example embodiment of FIG. 8, a magnetic temple sleeve 40 is provided with temple magnetic elements 42, and is configured to partially wrap around a glasses temple so as to be slidable to a desired location of the temple. In various example embodiments the sleeve 40 may be made of an elastic material that facilitates such sliding but resists movement along the temple without a force applied by the user. Such an embodiment may be useful, for example, with glasses that have unconventionally shaped temples. FIG. 9 illustrates a temple attachment according to another example embodiment of the present general inventive concept. In the example embodiment of FIG. 9, a magnetic temple attachment 44 is configured to be slipped over a distal end of the glasses temple via an opening 48 and to provide a friction fit therewith. The magnetic temple attachment 44 is provided with temple magnetic elements 42 proximate a side thereof, and an opening 46 in which to add or remove the temple magnetic elements 42. The temple is simply slid into the opening 48 of the magnetic temple attachment 44, with the temple magnetic elements 42 inside, and the glasses are ready to be selectively attached to the magnetic element or elements in the hat.

Figure 11:
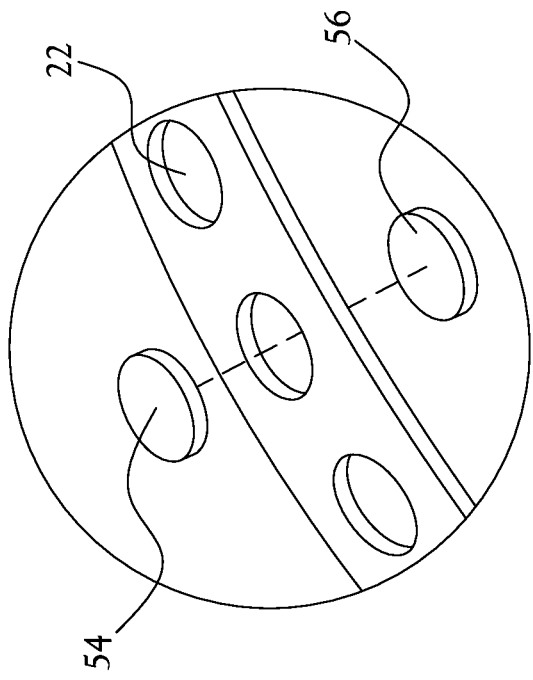
FIG. 11 illustrates a hatband magnetic fitting according to yet another example embodiment of the present general inventive concept.
Figure 10:
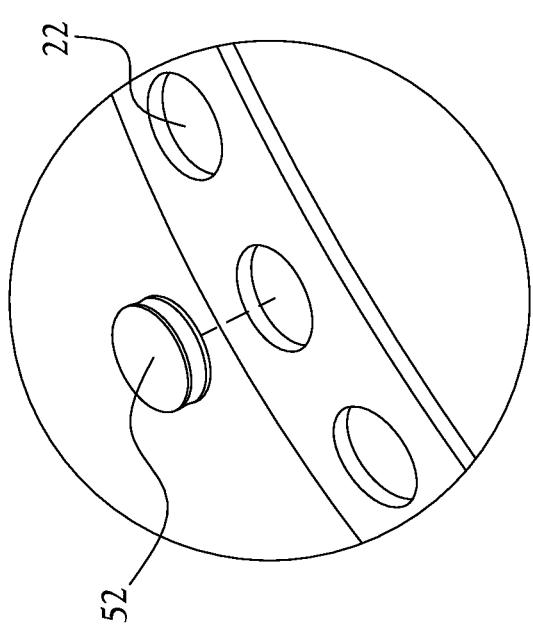
FIG. 10 illustrates a hatband magnetic fitting according to another example embodiment of the present general inventive concept.

FIG. 10 illustrates a hatband magnetic fitting according to another example embodiment of the present general inventive concept. In the example embodiment illustrated in FIG. 10, the hatband insert is provided with openings 22 and one or more hatband magnetic members 52 that are configured with a groove around the perimeter thereof, such that the hatband magnetic members 52 can be snapped into place in the openings 22. The overall diameter of the hatband magnetic members 52 may be sized slightly larger than the openings 22 to provide the snap fit. FIG. 11 illustrates a hatband magnetic fitting according to yet another example embodiment of the present general inventive concept. In the example embodiment illustrated in FIG. 11, one or more pairs of hatband magnetic members 54,56 are configured to be attracted each other through the openings 22 to therefore secure their position along the hatband insert. In this example embodiment, the openings may be slightly smaller than the diameter of the hatband magnetic members 54,56, such that a portion of the hatband insert surrounding the openings 22 is sandwiched between the hatband magnetic members 54,56. A host of selectively positionable magnetic element configurations may be used with a hatband insert without departing from the scope of the present general inventive concept.

Figure 12:
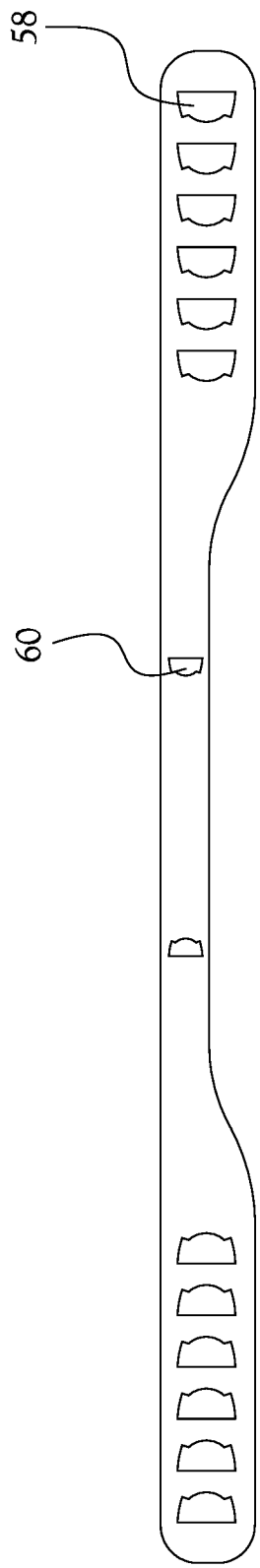
FIG. 12 illustrates a hatband insert according to still another example embodiment of the present general inventive concept.

FIG. 12 illustrates a hatband insert according to still another example embodiment of the present general inventive concept. In the example hatband insert of FIG. 12, a plurality of pockets 58 are formed along a length of the hatband to receive hatband magnetic elements that may be slid in the pockets to be secured therein. As illustrated in FIG. 12, a plurality of pockets 58 of a first size may be provided to receive hatband magnetic elements, and a plurality of pockets 60 of a smaller size may be provided to receive magnetic elements for metallic accessories to be secured to the hat. The pockets 58,60 may be formed with openings on only one side of the hatband insert, and having a flap extending from at least one side to partially overlap the magnetic element located inside the pocket.

Figure 13:
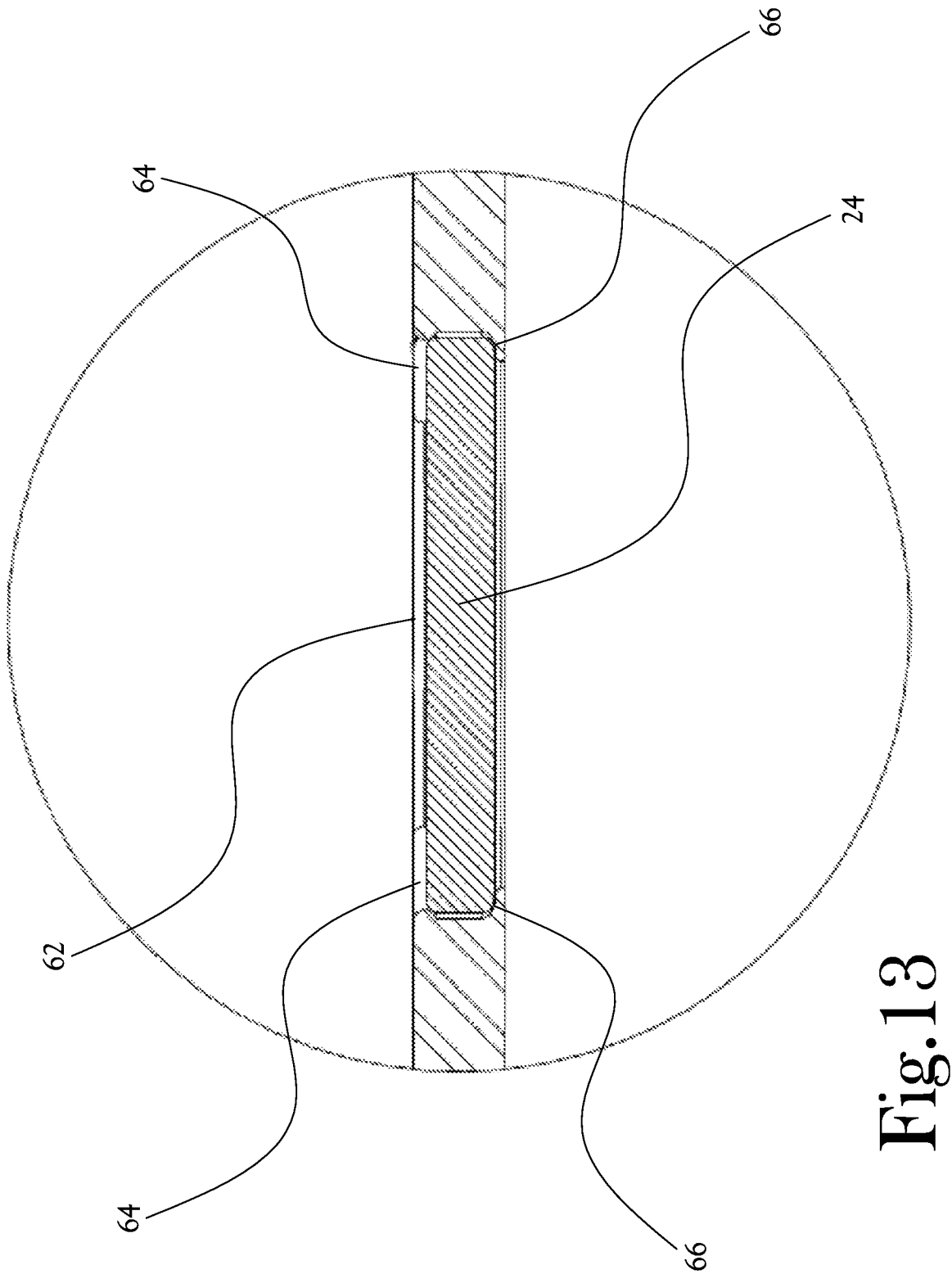
FIG. 13 illustrates hatband insert according to still another example embodiment of the present general inventive concept.

FIG. 13 illustrates a cross-section of a portion of a hatband insert according to still another example embodiment of the present general inventive concept. In the example embodiment illustrated in FIG. 13, a hatband insert 61 is provided with a plurality of openings 62 having rim portions 64,66 to secure a hatband magnetic member 24 in the opening 62. As illustrated in FIG. 13, one end of the opening 62 is provided with at least one rim portion 64 that extends from edge of the opening to prevent the hatband magnetic member 24 from passing therethrough, and the other end of the opening 62 is provided with at least one rim portion 66 that extends a smaller distance from the edge of the opening than does the rim portion 64, such that the hatband magnetic member 24 can be readily pushed therethrough but is still maintained in the opening 62 by the rim portion 66. Thus, the hatband magnetic member 24 can be snapped into place in the opening 62 by moving it through the end having the smaller rim portion 66. The rim portions 64 and/or 66 may extend from an entire perimeter of the ends of the openings 62, or may include a plurality of discontinuous projections extending from the perimeters.

Figure 14:
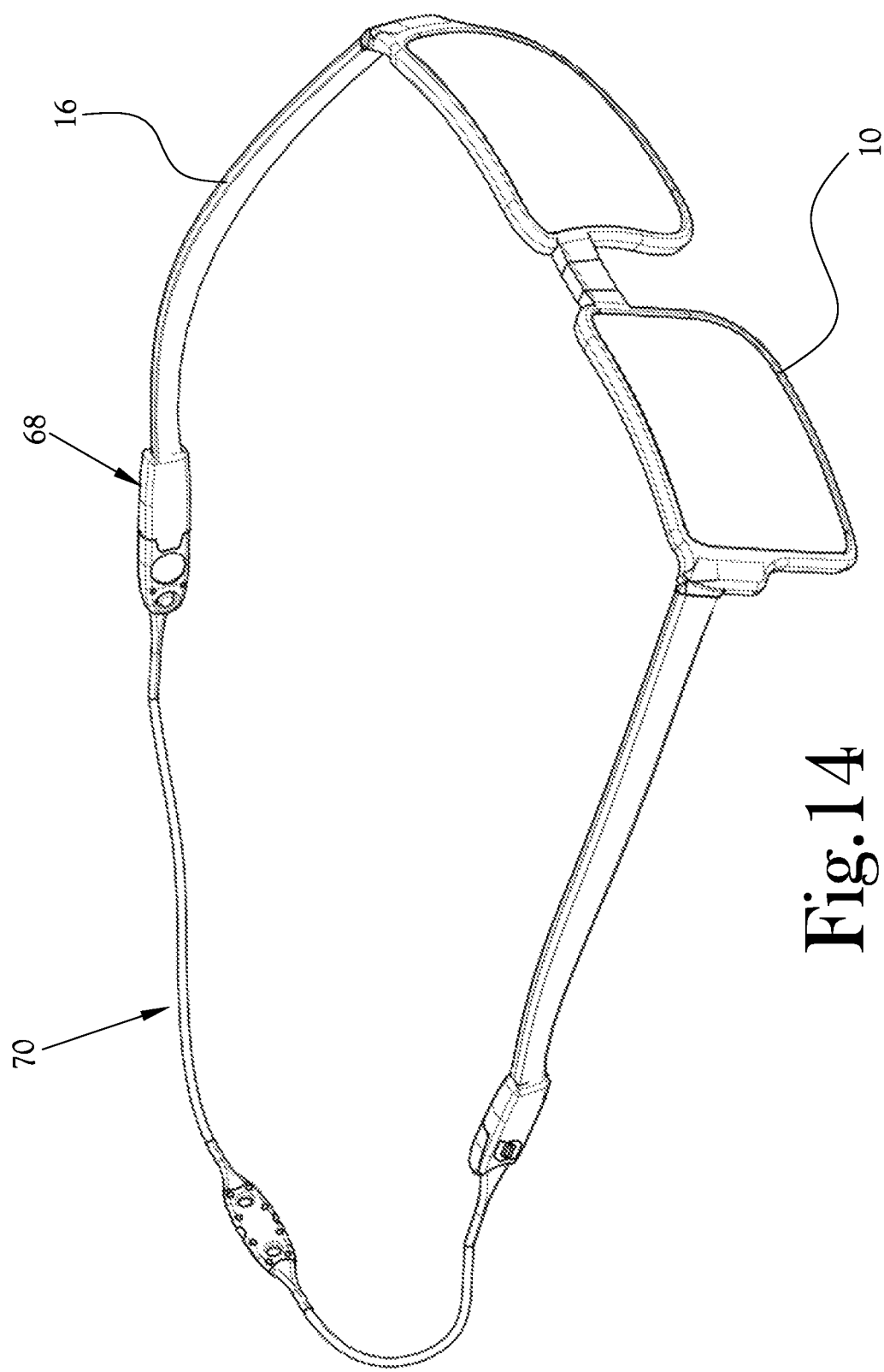
FIG. 14 illustrates the glasses portion of the system of FIG. 1 with a retaining strap according to an example embodiment of the present general inventive concept.

FIG. 14 illustrates the glasses portion of the system of FIG. 1 with a retaining strap according to an example embodiment of the present general inventive concept. In the example embodiment illustrated in FIG. 14, a retaining strap or tether 70 is selectively attachable at each end to a respective pair of magnetic temple attachments 68 attached to distal ends of the temples 16 of the glasses 10. Thus, the user is able to selectively employ a separate or additional type of securement to the glasses 10. As illustrated in the following drawings, the retaining strap is provided with a protruding member at each end to be selectively coupled to the magnetic temple attachments 68. FIGS. 15A-D illustrate various views and cross sections of an example embodiment of the magnetic temple attachment 68 of FIG. 14. In FIGS. 15A-D, the magnetic temple attachment 68 includes a temple opening 72 configured to receive a distal end of a temple and maintain a friction fit thereon. In this example, the magnetic temple attachment 68 is formed with a flexible region 74 to provide comfort and grip to the user when wearing the glasses, and a rigid region 76 that houses one or more temple magnetic elements 42. In various example embodiments, such a device may be formed with injection molding. The temple magnetic elements 42 may be secured in the rigid region 76 by an adhesive, or friction fit, or retaining rim member, or the like. The magnetic temple attachment 68 has an extending portion 78 that extends away from a distal end of the magnetic temple attachment 68, and which includes a receiving portion 80 that is configured to receive the protruding member formed at the end of the retaining strap 70 to securely couple the retaining strap to the magnetic temple attachment 68. In this example embodiment, the extending portion 78 of each of the magnetic temple attachments 68 is formed so as to be angled away from the wearer of the glasses 10 when the glasses 10 are being worn, so as to reduce any interference or other undesirable touching from the retaining strap 70 or coupling mechanism. In other various example embodiments such a magnetic temple attachment may be couplable to the retaining strap by magnetic elements provided at the ends of the strap and the temple magnetic elements 42 or other magnetic elements provided to the magnetic temple attachment. In various example embodiments a ball and socket configuration as described herein may be employed to couple the retaining strap to the magnetic temple attachment.

Figure 16:
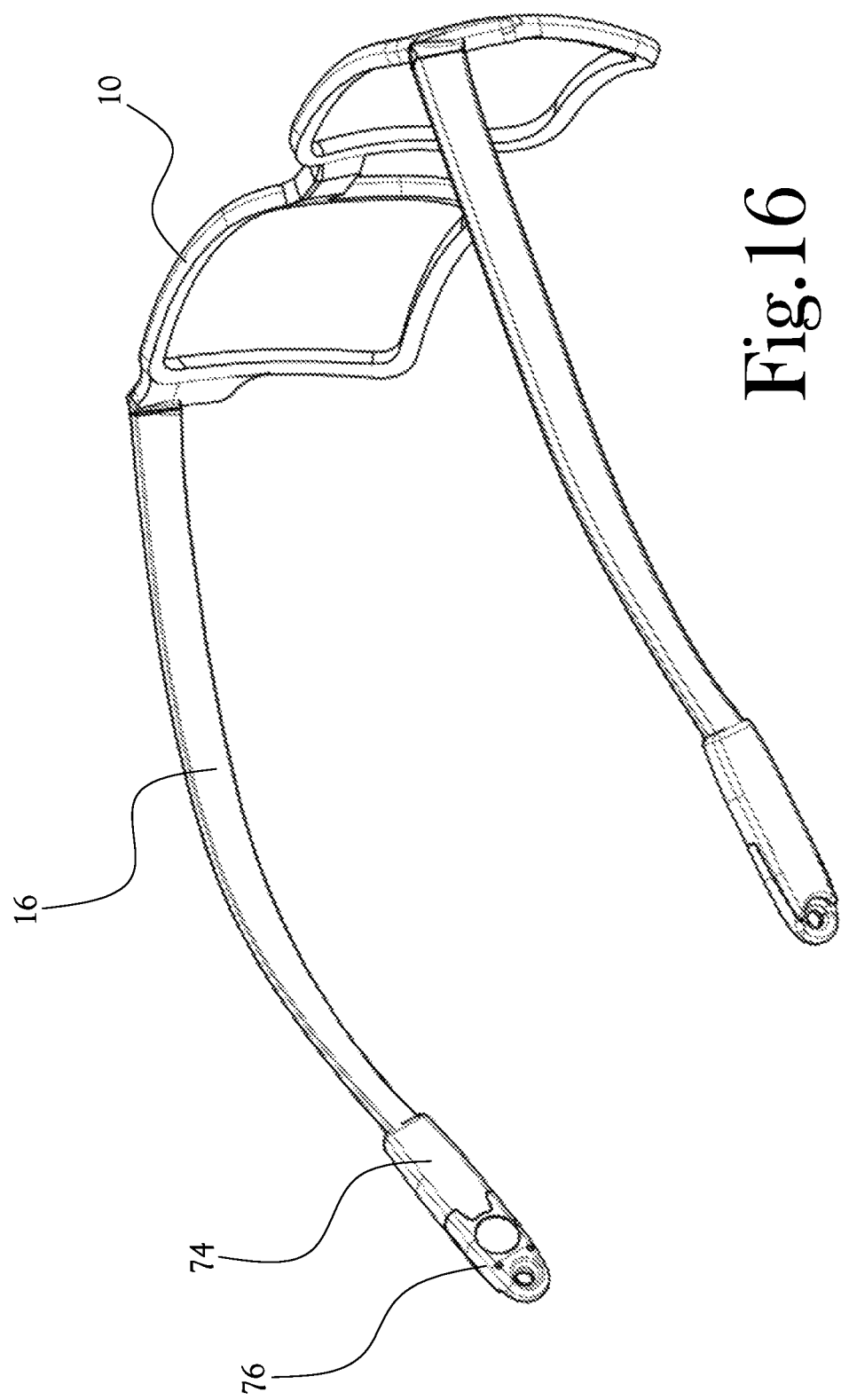
FIG. 16 illustrates the assembly illustrated in FIG. 14 with the retaining strap removed.
Figure 17:
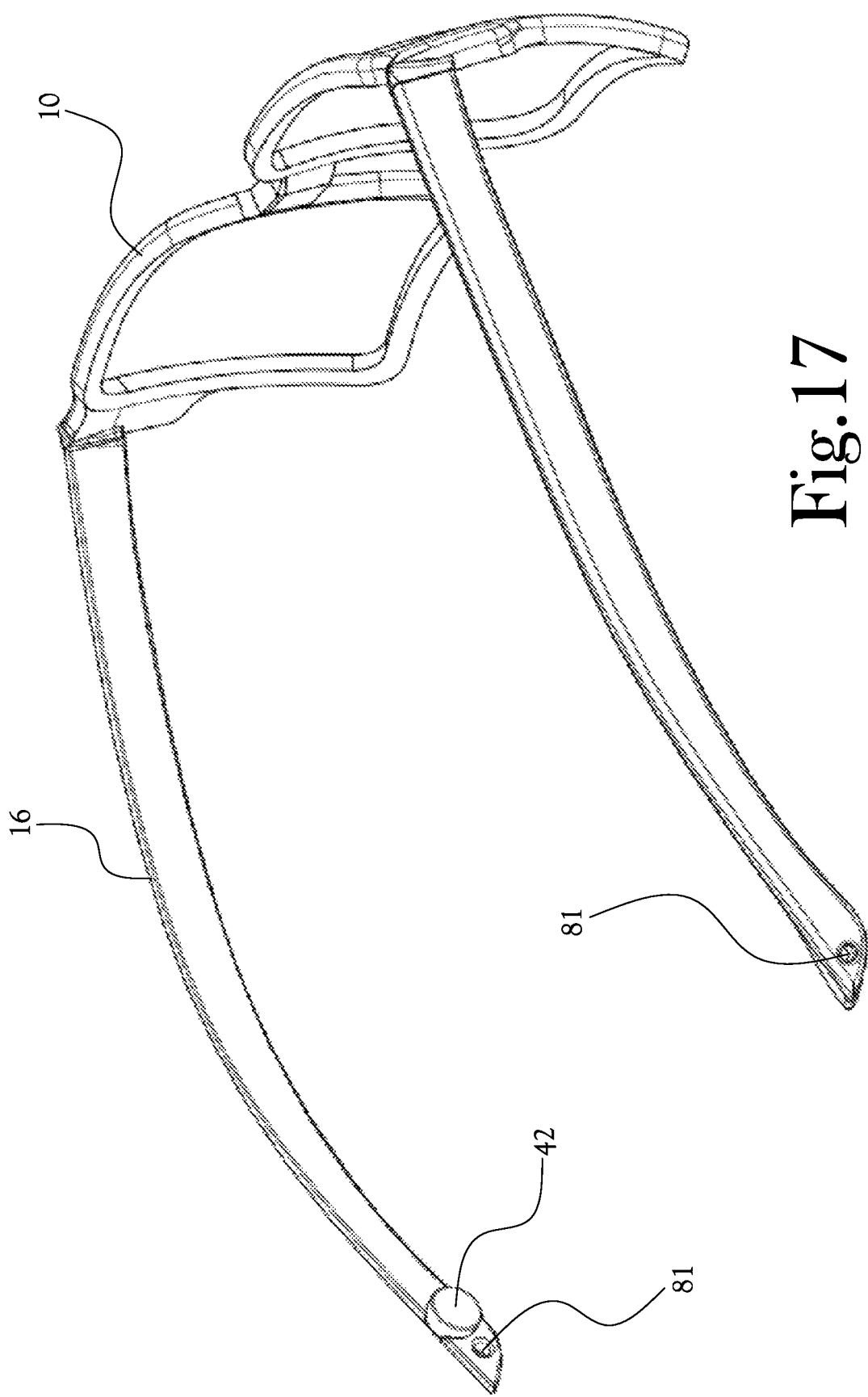
FIG. 17 illustrates a system to secure a pair of glasses according to another example embodiment of the present general inventive concept.
Figure 18B:
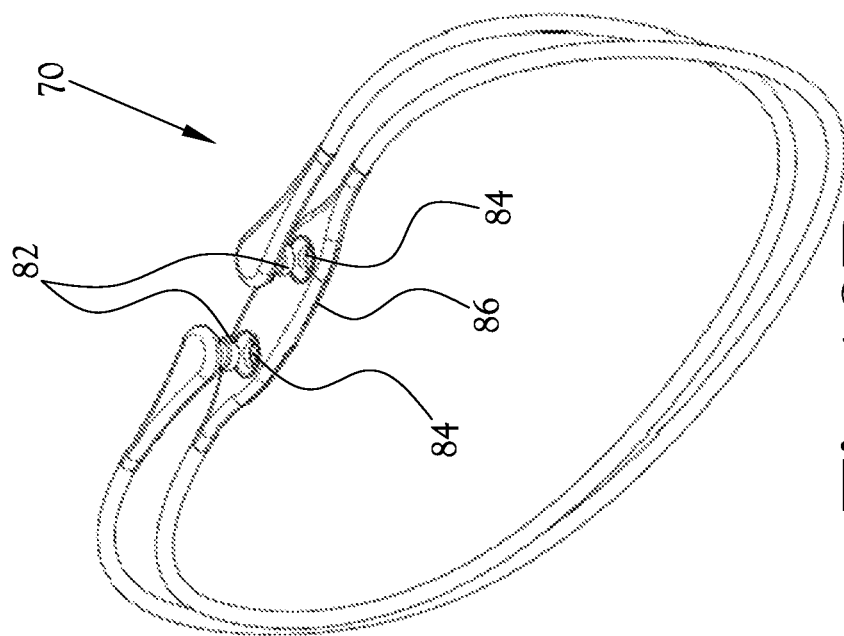
FIGS. 18A-D illustrate a method of storing the retaining strap of FIG. 14.
Figure 18A:
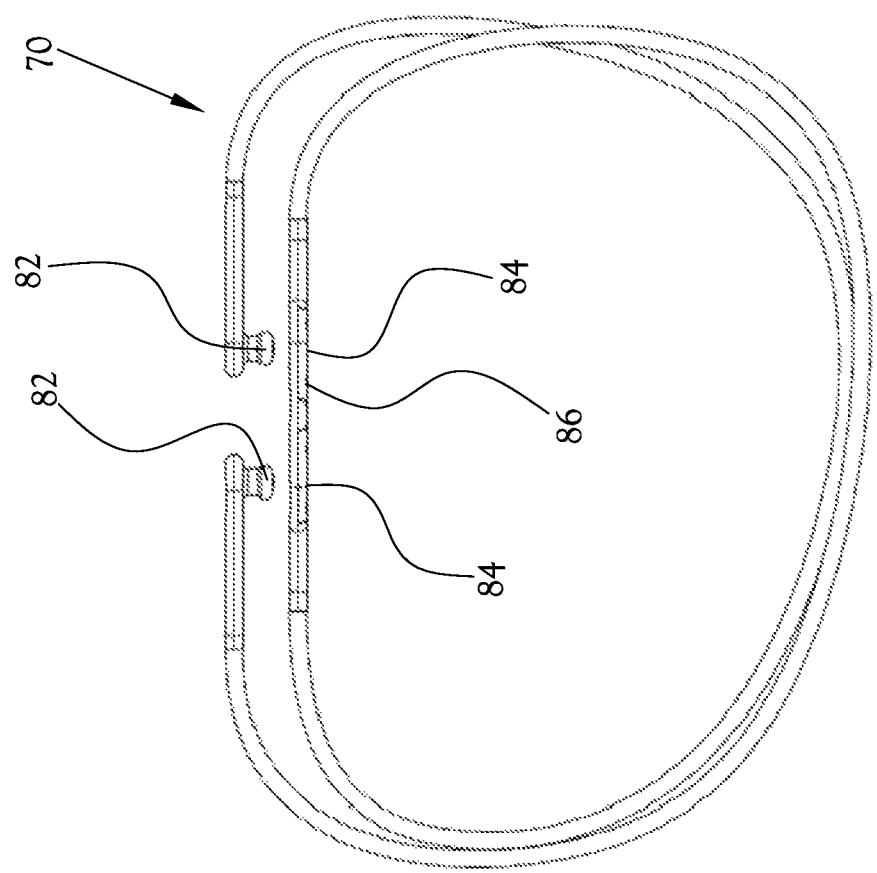
Figure 18D:
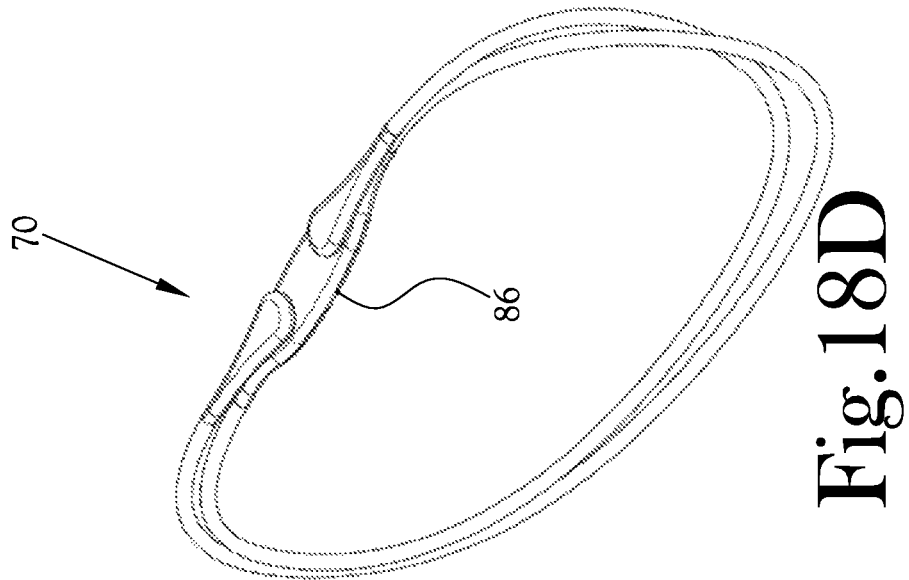
Figure 18C:
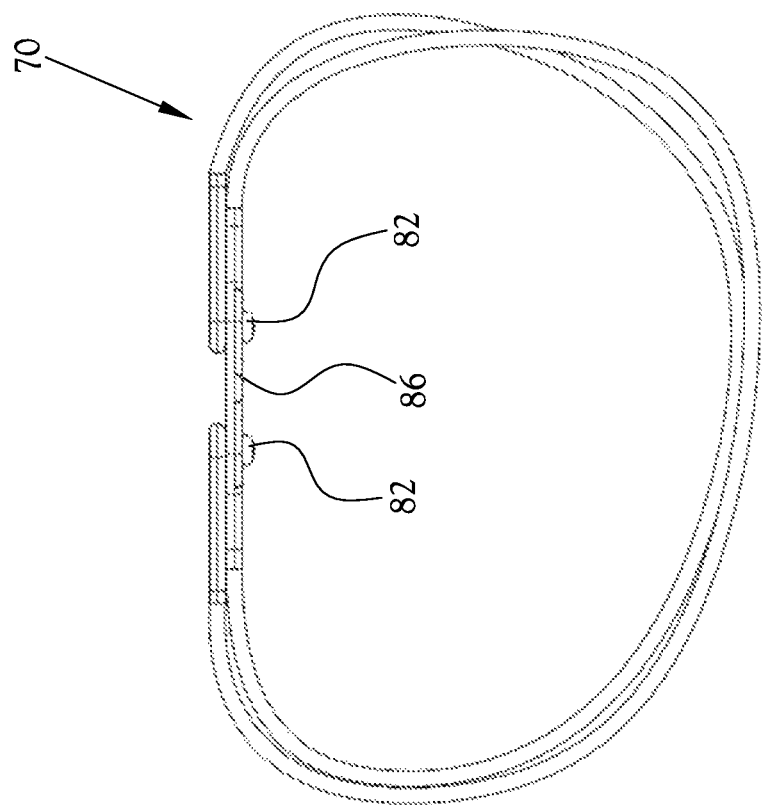

FIG. 16 illustrates the assembly of claim 14 with the retaining strap removed. As illustrated, the retaining strap 70 can simply be detached from the magnetic temple attachments 68 with little trouble, and the glasses 10 are still ready to be worn or attached to the hat 12 as usual, just as with the retaining strap 70 attached. FIG. 17 illustrates a system to secure a pair of glasses according to another example embodiment of the present general inventive concept. As illustrated in FIG. 17, a receiving portion 81 configured to receive the protruding portion 82 of the retaining strap 70 can simply be formed in the temples 16 themselves, and likewise temple magnetic elements 42 can be formed in the temples 16 or adhered thereto without further structure such as that provided by the previously described magnetic temple attachments 68.

FIGS. 18A-D illustrate various views of a method of storing the retaining strap 70 of FIG. 14. With conventional glasses retaining straps, a user is often relegated to either wearing the strap attached to the glasses at all times, or removing the strap and wadding it into a pocket or placing it aside to often be lost. The retaining strap 70 of this example embodiment includes a pair of receiving portions 84 configured to receive the protruding portions 82 located proximate the ends of the retaining strap 70, to provide a fit similar to those provided by the receiving portions 80 formed in the magnetic temple attachments 68. As with those receiving portions 80, the receiving portions 84 provided to the retaining strap 70 may secure the protruding portions 82 with a snap fit, a friction fit, or the like. In this example embodiment, the protruding portions 82 are formed with a tapered neck to provide the snap fit coupling in the receiving portions 80,84. The retaining strap 70 may also be formed with a flat portion 86 provided proximate the middle of the retaining strap 70, on which may indicia may be located by paint, adhesive, integral raised characters/figures, and so on, such that the retaining straps 70 may be used for advertising, identification, and so on. The flat portion 86 may extend between the receiving portions 84 of the strap 70, or include the receiving portions 84. FIGS. 19A-B illustrate a user wearing the stored retaining strap of FIGS. 18A-D. As illustrated, the retaining strap 70 can be looped and worn as a bracelet to create a fashionable alternative to storing the strap 70 when not in use.

Figure 20B:
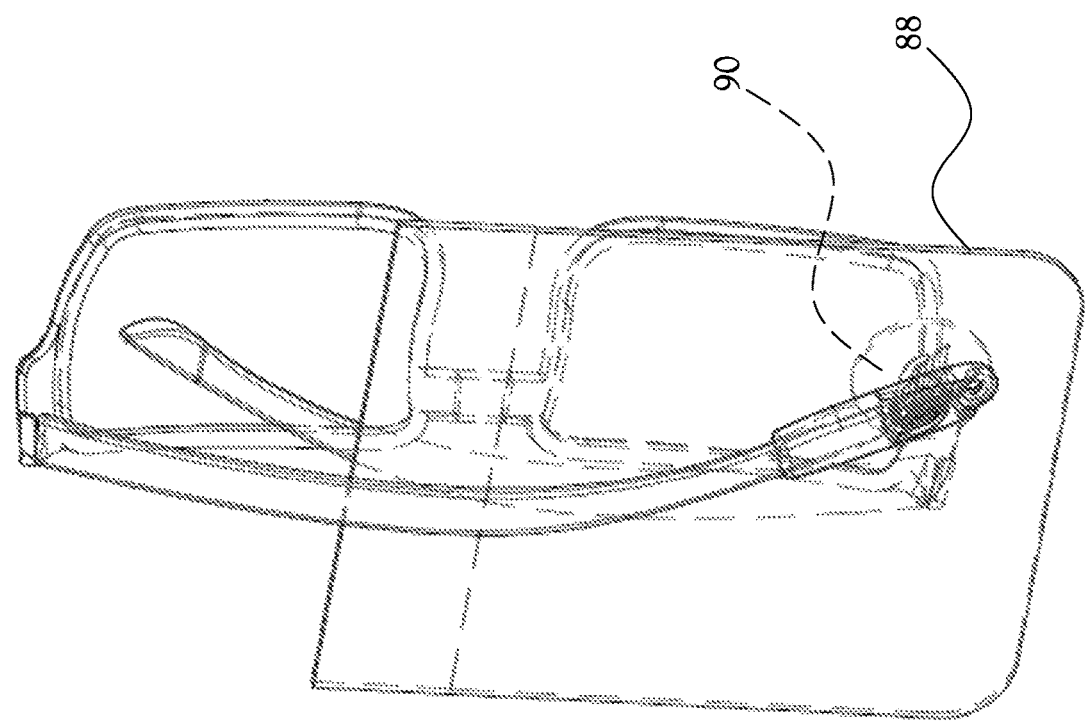
FIGS. 20A-B illustrate a system to secure glasses to clothing according to an example embodiment of the present general inventive concept.
Figure 20A:
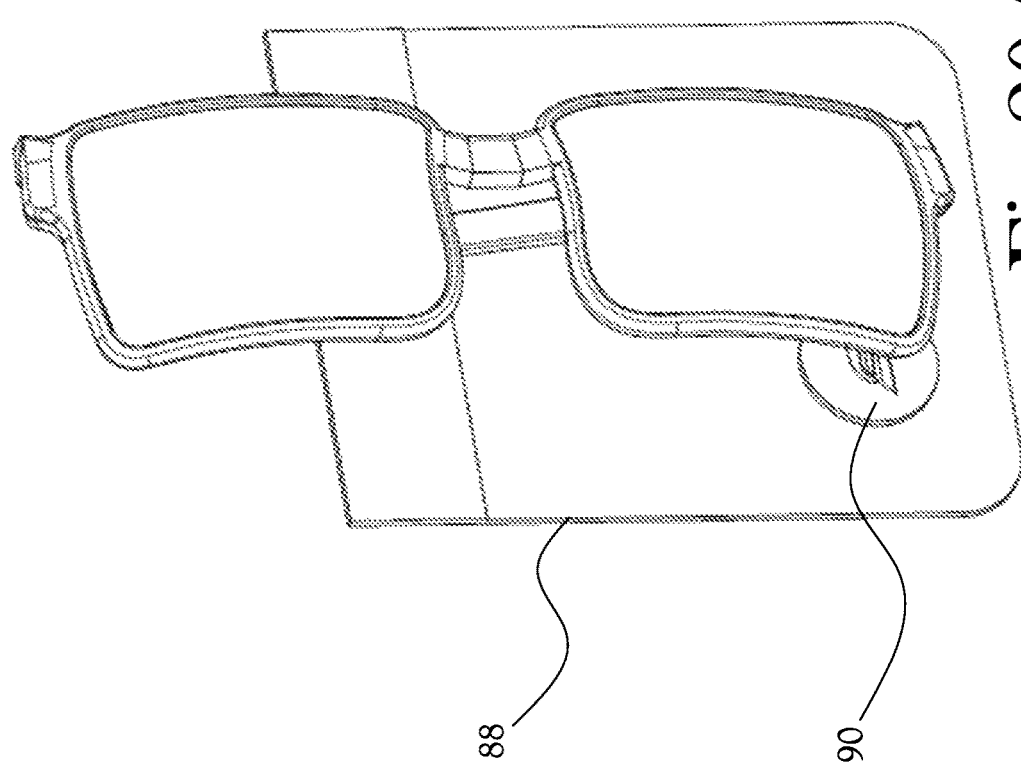
Figure 21B:
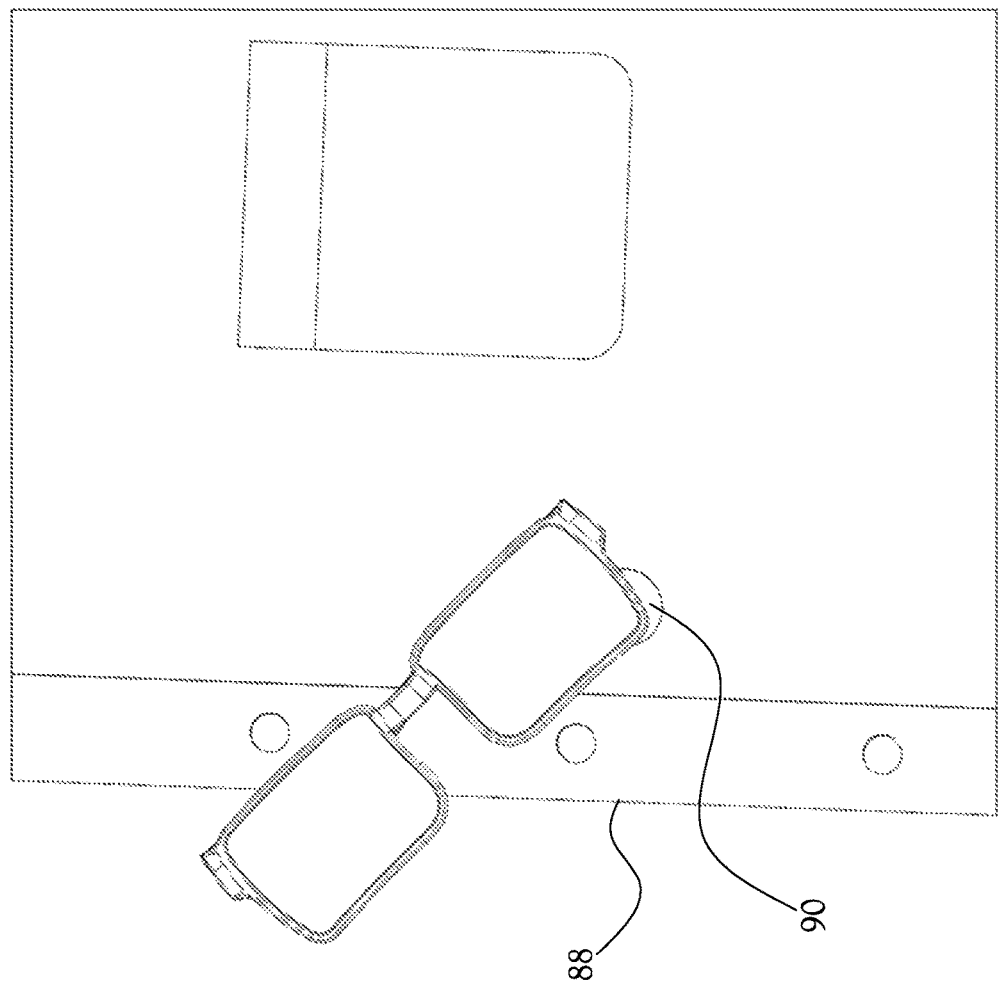
FIGS. 21A-B illustrate the system of FIGS. 20A-B being used at another part of clothing according to an example embodiment of the present general inventive concept.
Figure 21A:
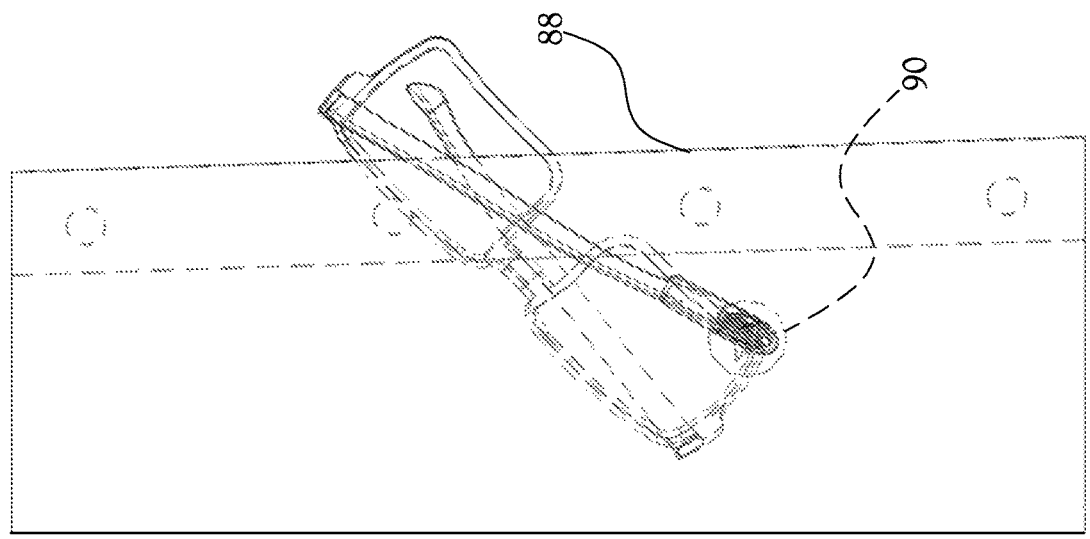

FIGS. 20A-B illustrate a system to secure glasses to clothing according to an example embodiment of the present general inventive concept. As illustrated in this example embodiment, because the glasses 10 are equipped with the magnetic temple attachments, another magnetic accessory such as, for example, a ball marker 90, can be used to sandwich the cloth of a pocket 88 between the ball marker 90 and the magnetic temple attachment to secure the glasses therein. Such use is not relegated to pocket storage, as FIGS. 21A-B illustrate the system of FIGS. 20A-B being used at another part of clothing according to an example embodiment of the present general inventive concept.

FIGS. 22A-C illustrate a hatband insert according to still another example embodiment of the present general inventive concept. In the example embodiment illustrated in FIGS. 22A-C, a hatband insert 100 is formed with a first layer 102 having a first thickness provided generally around the perimeter of the hatband insert 100, and a second layer 104, having a second thickness smaller than the first thickness, that extends inward from the first layer 104 to form openings 106. These openings 106 are sized to be smaller than the diameter of the hatband magnetic members 54,56 which are selectively attached to the hatband insert 100 in a sandwiched fashion. The tapering from the first layer 102 to the second layer 104 provides a fitted area for tops and bottoms of the hatband magnetic members 54,56, and the thinner second layer 104 provides perimeters around the openings 106 that are sandwiched between the hatband magnetic members 54,56 when the hatband magnetic members 54,56 are so fixed to the hatband insert 100.

Various example embodiments of the present general inventive concept may provide a system to secure a pair of glasses to a hat, the system including a hatband insert configured to be inserted in a hatband of a hat, one or more hatband magnetic members configured to be selectively attachable to a plurality of locations of the hatband insert, and one or more glasses magnetic members configured to be attached to each temple of a pair of glasses, wherein the one or more hatband magnetic members and the one or more glasses magnetic members are configured to be magnetically attached to selectively secure the glasses to the hat. The hatband insert may be configured with a plurality of openings located along a length of the hatband insert to receive the one or more hatband magnetic members. The openings may be configured with at least partial rim projections on both ends of the openings to secure the one or more hatband magnetic members therein. The plurality of openings may include at least one opening having a first size configured to receive the one or more hatband magnetic members, and at least one opening having a second size configured to receive an accessory magnetic member, the second size being smaller than the first size. A central portion of the hatband may be more narrow than end portions of the hatband, the at least one opening having a second size being formed in the more narrow central portion. The system may further include a plurality of protruding members extending outwardly around an outer perimeter of the hatband insert, and a receiving portion provided in the one or more hatband magnetic members and configured to form a snap fit with the protruding members so as to be readily attached and detached from the hatband insert. The one or more hatband magnetic members may be configured as slidable members surrounding at least a top or bottom edge of the hatband insert, and configured to be selectively located at a desired location of the hatband insert. The system may further include a plurality of openings formed in the hatband insert to receive the one or more hatband magnetic members, and a groove formed around a perimeter of the one or more hatband magnetic members and configured to receive a rim of any of the openings formed in the hatband insert to secure the one or more hatband magnetic members at a desired location. The system may further include a plurality of openings formed in the hatband insert to receive the one or more hatband magnetic members, and respective pairs of the one or more hatband magnetic members may be configured to at least partially overlap a rim of any of the receiving portions to form a sandwiched connection securing the paired magnetic members to the hatband insert at a desired location. The system may further include a pair of temple attachments each configured to hold at least one of the one or more glasses magnetic members and to slip over a distal end of the temple to attach the one or more glasses magnetic members to the temple. The system may further include a retaining strap, and the temple attachments may each include an extending portion extending from the temple attachment and configured to be coupled to an end of the retaining strap such that the retaining strap is selectively attachable to the temple attachments. The retaining strap may be formed with a protruding member proximate each end of the retaining strap, and the extending portion of the temple attachments may each be formed with a receiving portion to receive the respective protruding members of the retaining strap. The protruding members of the retaining strap may be configured to form a snap fit with the receiving portions of the extending portions. The retaining strap may be formed with a pair of receiving portions proximate a middle area of the retaining strap, and the receiving portion may be configured to respectively receive the protruding members of the retaining strap when the protruding members are not received by the temple attachments. The retaining strap may include a flattened portion formed between the pair of receiving portions of the retaining strap, and the flattened portion may be configured to display indicia thereon. The retaining strap may be formed with a magnetic strap member proximate each end of the retaining strap, and the extending portion of the temple attachments may each be formed with a secondary magnetic member to be magnetically attached to the magnetic strap members of the retaining strap.

Various example embodiments of the present general inventive concept may provide a retaining system for retaining a pair of glasses, the system including a retaining strap having coupling portions provided at each end, the coupling portions being configured to be coupled to respective eyeglass temples, and a pair of auxiliary coupling portions proximate a middle area of the retaining strap, the auxiliary coupling portions being configured to be respectively coupled to the coupling portions of the retaining strap when the coupling portions are not coupled to the eyeglass temples. The retaining system may further include a pair of temple attachments each configured to slip over distal ends of eyeglass temples, and to be selectively coupled to the coupling portions of the retaining strap. The coupling portions of the retaining strap may be formed as protruding members, the temple attachments may each include a receiving portion to respectively receive the protruding members to form a snap fit, and the auxiliary coupling portions may be formed to respectively receive the protruding members when not received by the receiving portions of the temple attachments.

Various example embodiments of the present general inventive concept may provide a system to secure a pair of glasses to a hat, the system including a hatband insert configured to be inserted in a hatband of a hat, the hatband insert being formed with a plurality of openings along a length thereof, one or more hatband magnetic members configured to be selectively attachable to the plurality of openings in the hatband insert, a pair of temple attachments each configured to slip over eyeglass temples and hold one or more glasses magnetic members configured to be magnetically attached to the hatband magnetic members to selectively secure the glasses to the hat, and a retaining strap configured with a protruding member at each end, wherein the temple attachments include extending portions configured to extend back from the temples and having receiving portions configured to selectively receive the protruding members of the retaining straps, and wherein the retaining strap is formed with a pair of auxiliary receiving portions proximate a middle area of the retaining strap, the auxiliary receiving portions configured to respectively receive the protruding members of the retaining strap when the protruding members are not received by the temple attachments.

As discussed herein, various example embodiments of the present general inventive concept may provide a hatband insert that can be hidden inside the hatband of a hat. The hatband insert may be formed of a magnetic element, and/or the hatband insert may be provided with magnets that are easily positioned at different portions of the hatband insert so that magnets provided to the earpiece of the glasses can be magnetically coupled to the hat at the user's desired location/position. For example, in various example embodiments the hatband insert can be configured so that the magnets snap to a plurality of locations around the hatband insert. In such example embodiments, either the hatband insert or the magnets can be respectively formed with male and female members to provide a snapping or friction fit type of attachment. In various example embodiments a slidable member can be provided with a magnet and configured to moved to a desired position of the hatband insert simply by sliding the slidable member thereto. In example embodiments the hatband insert may be adjustable in length, so that either fixed or adjustable magnets can be repositioned relative to the hat by simply changing the length of the hatband insert. In various example embodiments holes or other such receiving portions may be formed in the hatband insert for the magnets to be popped into via grooves formed around the perimeters of the magnets, or two magnet portions can be affixed to one another magnetically through the hole such that the magnets overlap the perimeter of the hole to sandwich the hatband insert therebetween. In various example embodiments pockets may be formed in the hatband insert to receive the magnets in locations selectable by the user. The pockets may be formed with a flap portion substantially opposite the deepest portion of the pocket, so that the flap portion may overlap a portion of the magnet and/or or pocket to more securely hold the magnet in the pocket.

In various example embodiments magnets can be provided to the earpiece of the glasses via a sleeve, loop, etc., that slips over the earpiece. Such a sleeve may be resiliently pliable so as to form a slip fit over the earpiece. In various example embodiments, the sleeve is not a sleeve that completely covers the earpiece, but may have one or more open portions. The sleeve may have an extension extending away from an end of the earpiece to provide other attachment alternatives or auxiliary connections. For example, the sleeve extension may have an additional magnet to provide more connection to the hatband insert. In various example embodiments, the sleeve extension may have an opening to receive a male member of a strap, tether, lanyard, etc., so that the glasses can also be worn around the neck when desired. Such a connection may be configured so that the extension, and therefore the earpiece, swivels in relation to the male member. In various example embodiments, such a swivel connection may be configured as a ball and socket tether securing the extension to the lanyard, rather than a male-female slip fit.

Various example embodiments of the present general inventive concept also provide another "free" magnet that can be used to secure the glasses to another article of clothing or surface that can be located between the free magnet and the magnet provided to the earpiece of the glasses. For example, the free magnet can be similar to a magnetic golf ball marker, and thus could be used to sandwich a portion of the shirt between the free magnet and the earpiece when the glasses are worn in the front of the shirt, or in a shirt pocket, and the free magnet can be coupled to the hatband insert when not being used to secure the glasses to another location. The free magnet can be designed in a variety of ornamental fashions.

Various example embodiments of the present general inventive concept may provide a system to secure glasses to a hat, the system including a hatband insert configured to be inserted in a hatband of the hat, at least one hatband magnetic portion configured to be coupled to the hatband insert, and at least one glasses magnetic portion configured to be coupled to an earpiece of the glasses, wherein the at least one hatband magnetic portion and the at least one glasses magnetic portion are configured to be magnetically coupled to secure the glasses to the hat.

The hatband insert and at least one hatband magnetic portion may be configured so that the at least one hatband magnetic portion is selectively couplable to a plurality of locations of the hatband insert. The system may further include a plurality of bosses extending outwardly around an outer perimeter of the hatband insert, and a boss receiving portion provided in the at least one hatband magnetic portion and configured to form a snap fit with one of the bosses so as to be readily coupled and decoupled from the hatband insert. The at least one hatband magnetic portion may be configured as a slidable member to be selectively located at a desired location of the hatband insert. The system may further include a plurality of receiving portions formed in the hatband insert to receive the at least one hatband magnetic portion, and a groove formed around a perimeter of the at least one hatband magnetic portion and configured to receive a rim of any of the receiving portions formed in the hatband insert to secure the at least one hatband magnetic portion at a desired location. The system may further include a plurality of receiving portions formed in the hatband insert to receive the at least one hatband magnetic portion, wherein the at least one hatband magnetic portion is configured as two magnetic portions that at least partially overlap a rim of any of the receiving portions to form a sandwiched connection securing the two magnetic portions to the hatband insert at a desired location. The system may further include a plurality of pocket portions formed in the hatband insert to receive the at least one hatband magnetic portion, wherein the pocket portions are formed with a flap portion configured to fit over a portion of the at least one hatband magnetic portion to secure the portion of the at least one hatband magnetic portion in the pocket portion. The hatband insert may be configured so as to be adjustable in length to change to selectively change a location of the at least one hatband magnetic portion.

The system may further include a sleeve portion configured hold the at least one glasses magnetic portion and to slip over the earpiece to couple the at least one glasses magnetic portion of the earpiece. The system may further include an extending portion extending from an end of the sleeve portion to provide an auxiliary glasses securing connection. The system may further include an auxiliary magnetic portion coupled to the extending portion. The auxiliary magnetic portion may be configured to be selectively removable. The system may further include a receiving portion formed in the extending portion and configured to receive a removable auxiliary magnetic portion. The system may further include a receiving portion formed in the extending portion, and a swivel fitting configured to be received in the receiving portion of the extending portion to couple the glasses to the swivel fitting through the extending portion so as to pivot around the swivel fitting, wherein the receiving portion and swivel fitting are configured such that the sleeve portion is readily and selectively removable from the swivel fitting, and wherein the swivel fitting if provided at an end of a lanyard. The system may further include a free magnetic member configured to magnetically attracted to the at least one glasses magnetic portion such that the free magnetic member can secure the glasses to a portion of clothing sandwiched between the free magnetic member and the at least one glasses magnetic portion.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A system to secure a pair of glasses to a hat, the system comprising:
    a hatband insert configured to be inserted in a hatband of a hat;
    one or more hatband magnetic members configured to be selectively attachable to a plurality of locations of the hatband insert;
    one or more glasses magnetic members configured to be attached to each temple of a pair of glasses;
    a pair of temple attachments each configured to hold at least one of the one or more glasses magnetic members and to slip over a distal end of the temple to attach the one or more glasses magnetic members to the temple; and
    a retaining strap, and wherein the temple attachments each comprise an extending portion extending from the temple attachment and configured to be coupled to an end of the retaining strap such that the retaining strap is selectively attachable to the temple attachments;
    wherein the one or more hatband magnetic members and the one or more glasses magnetic members are configured to be magnetically attached to selectively secure the glasses to the hat;
    the retaining strap is formed with a protruding member proximate each end of the retaining strap, and wherein the extending portion of the temple attachments are each formed with a receiving portion to receive the respective protruding members of the retaining strap; and
    the retaining strap is formed with a pair of receiving portions proximate a middle area of the retaining strap, the receiving portion configured to respectively receive the protruding members of the retaining strap when the protruding members are not received by the temple attachments.

2. The system of claim 1, wherein the hatband insert is configured with a plurality of openings located along a length of the hatband insert to receive the one or more hatband magnetic members.

3. The system of claim 2, wherein the openings are configured with at least partial rim projections on both ends of the openings to secure the one or more hatband magnetic members therein.

4. The system of claim 2, wherein the plurality of openings comprises:
    at least one opening having a first size configured to receive the one or more hatband magnetic members; and
    at least one opening having a second size configured to receive an accessory magnetic member, the second size being smaller than the first size.

5. The system of claim 4, wherein a central portion of the hatband is more narrow than end portions of the hatband, the at least one opening having a second size being formed in the more narrow central portion.

6. The system of claim 1, further comprising:
    a plurality of protruding members extending outwardly around an outer perimeter of the hatband insert; and
    a receiving portion provided in the one or more hatband magnetic members and configured to form a snap fit with the protruding members so as to be readily attached and detached from the hatband insert.

7. The system of claim 1, wherein the one or more hatband magnetic members are configured as slidable members surrounding at least a top or bottom edge of the hatband insert, and configured to be selectively located at a desired location of the hatband insert.

8. The system of claim 1, further comprising:
    a plurality of openings formed in the hatband insert to receive the one or more hatband magnetic members; and
    a groove formed around a perimeter of the one or more hatband magnetic members and configured to receive a rim of any of the openings formed in the hatband insert to secure the one or more hatband magnetic members at a desired location.

9. The system of claim 1, further comprising:
    a plurality of openings formed in the hatband insert to receive the one or more hatband magnetic members;
    wherein respective pairs of the one or more hatband magnetic members are configured to at least partially overlap a rim of any of the receiving portions to form a sandwiched connection securing the paired magnetic members to the hatband insert at a desired location.

10. The system of claim 1, wherein the protruding members of the retaining strap are configured to form a snap fit with the receiving portions of the extending portions.

11. The system of claim 1, wherein the retaining strap includes a flattened portion formed between the pair of receiving portions of the retaining strap, the flattened portion configured to display indicia thereon.

12. A system to secure a pair of glasses to a hat, the system comprising:
- a hatband insert configured to be inserted in a hatband of a hat, the hatband insert being formed with a plurality of openings along a length thereof;
- one or more hatband magnetic members configured to be selectively attachable to the plurality of openings in the hatband insert;
- a pair of temple attachments each configured to slip over eyeglass temples and hold one or more glasses magnetic members configured to be magnetically attached to the hatband magnetic members to selectively secure the glasses to the hat; and
- a retaining strap configured with a protruding member at each end;
- wherein the temple attachments include extending portions configured to extend back from the temples and having receiving portions configured to selectively receive the protruding members of the retaining straps; and
- wherein the retaining strap is formed with a pair of auxiliary receiving portions proximate a middle area of the retaining strap, the auxiliary receiving portions configured to respectively receive the protruding members of the retaining strap when the protruding members are not received by the temple attachments.

13. A system to secure a pair of glasses to a hat, the system comprising:
- a hatband insert configured to be inserted in a hatband of a hat;
- one or more hatband magnetic members configured to be selectively attachable to a plurality of locations of the hatband insert;
- one or more glasses magnetic members configured to be attached to each temple of a pair of glasses;
- a pair of temple attachments each configured to hold at least one of the one or more glasses magnetic members and to slip over a distal end of the temple to attach the one or more glasses magnetic members to the temple; and
- a retaining strap, and wherein the temple attachments each comprise an extending portion extending from the temple attachment and configured to be coupled to an end of the retaining strap such that the retaining strap is selectively attachable to the temple attachments;
- wherein the one or more hatband magnetic members and the one or more glasses magnetic members are configured to be magnetically attached to selectively secure the glasses to the hat;
- wherein the retaining strap is formed with a magnetic strap member proximate each end of the retaining strap, and wherein the extending portion of the temple attachments are each formed with a secondary magnetic member to be magnetically attached to the magnetic strap members of the retaining strap; and
- the retaining strap is formed with receiving portion proximate a middle area of the retaining strap, the receiving portion configured to respectively receive the magnetic strap members when the magnetic strap members are not received by the temple attachments.

\* \* \* \* \*